(12) United States Patent
Kim et al.

(10) Patent No.: US 12,340,122 B2
(45) Date of Patent: Jun. 24, 2025

(54) METHOD OF OPERATING STORAGE DEVICE USING PROGRAM SUSPENSION CONTROL AND STORAGE DEVICE PERFORMING THE SAME

(71) Applicant: Samsung Electronics Co., Ltd., Suwon-si (KR)

(72) Inventors: Youngil Kim, Suwon-si (KR); Jeongjae Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 81 days.

(21) Appl. No.: 18/336,355

(22) Filed: Jun. 16, 2023

(65) Prior Publication Data

US 2024/0176543 A1 May 30, 2024

(30) Foreign Application Priority Data

Nov. 25, 2022 (KR) .................. 10-2022-0160064

(51) Int. Cl.
G06F 3/06 (2006.01)

(52) U.S. Cl.
CPC .......... *G06F 3/0659* (2013.01); *G06F 3/0604* (2013.01); *G06F 3/0611* (2013.01); *G06F 3/0688* (2013.01)

(58) Field of Classification Search
CPC .... G06F 3/0659; G06F 3/0604; G06F 3/0611; G06F 3/0688; G06F 3/061; G06F 2212/1016; G06F 2212/7204; G06F 3/0679; G06F 2212/1008; G06F 12/0246; G06F 2212/1024; G06F 2212/7208; G06F 3/0656; G06F 3/0658
See application file for complete search history.

(56) References Cited

U.S. PATENT DOCUMENTS 7,679,133 B2   3/2010 Son et al.
8,553,466 B2  10/2013 Han et al.
(Continued)

FOREIGN PATENT DOCUMENTS

KR   2020/0098336 A   8/2020

OTHER PUBLICATIONS

Extended European Search Report dated Feb. 26, 2024 issued in European Patent Application No. 23199246.2-1224.

*Primary Examiner* — Sean D Rossiter
(74) *Attorney, Agent, or Firm* — Harness, Dickey & Pierce, P.L.C.

(57) ABSTRACT

In a method of operating a storage device, first information associated with operation of the storage device is received from a host device. Second information internally generated based on write requests, read requests, and operation of the storage device is received. Program commands and read commands are transmitted to nonvolatile memories. Suspension commands are transmitted to at least one of nonvolatile memories. The suspension commands are generated based on the first and second information and are used to temporarily stop program operations performed based on the program commands. The number and timing of transmitting the suspension commands are controlled based on the first and second information. In response to changing at least one of the write requests and the read requests, the number and timing of transmitting the suspension commands are adaptively changed.

20 Claims, 23 Drawing Sheets

(56) References Cited

U.S. PATENT DOCUMENTS

| | | |
|---|---|---|
| 8,559,235 B2 | 10/2013 | Yoon et al. |
| 8,654,587 B2 | 2/2014 | Yoon et al. |
| 9,886,214 B2 | 2/2018 | Micheloni et al. |
| 10,423,335 B2 | 9/2019 | Ebsen et al. |
| 10,474,389 B2 | 11/2019 | Lesartre et al. |
| 10,861,558 B2 | 12/2020 | Park |
| 10,908,839 B2 | 2/2021 | Jo |
| 11,036,544 B2 | 6/2021 | Park et al. |
| 11,150,809 B2 | 10/2021 | Kim et al. |
| 11,307,794 B2 | 4/2022 | Ji et al. |
| 11,385,831 B2 | 7/2022 | Kim et al. |
| 11,487,478 B2 | 11/2022 | Kanno |
| 11,487,576 B2 | 11/2022 | Park et al. |
| 11,789,748 B2 | 10/2023 | Zeleniak et al. |
| 2011/0233648 A1 | 9/2011 | Seol et al. |
| 2018/0011660 A1 | 1/2018 | Lesartre et al. |
| 2018/0268908 A1* | 9/2018 | Iwasaki ............... G11C 7/06 |
| 2019/0004710 A1 | 1/2019 | Ebsen et al. |
| 2019/0272123 A1* | 9/2019 | Gissin ............... G06F 3/0659 |
| 2020/0159444 A1 | 5/2020 | Jo |
| 2020/0202934 A1* | 6/2020 | Imamoto ............ G11C 16/10 |
| 2022/0057966 A1* | 2/2022 | Kanno ............... G06F 3/0653 |
| 2022/0107818 A1 | 4/2022 | Zeleniak et al. |

\* cited by examiner

METHOD OF OPERATING STORAGE DEVICE USING PROGRAM SUSPENSION CONTROL AND STORAGE DEVICE PERFORMING THE SAME

CROSS-REFERENCE TO RELATED APPLICATION

This application claims priority under 35 USC § 119 to Korean Patent Application No. 10-2022-0160064 filed on Nov. 25, 2022 in the Korean Intellectual Property Office (KIPO), the contents of which are herein incorporated by reference in their entirety.

BACKGROUND

Various example embodiments relate generally to semiconductor integrated circuits, and more particularly to methods of operating storage devices using program suspension control, and/or storage devices performing the methods.

One or more semiconductor memory devices may be used in data storage devices. Examples of such data storage devices include solid state drives (SSDs). SSDs typically use flash memory and function as secondary storage. SSDs may have various design and/or performance advantages over hard disk drives (HDDs). Examples include the absence of moving mechanical parts, higher data access speeds, stability, durability, and/or low power consumption. Various systems, e.g., one or more of a laptop computer, a car, an airplane, a drone, etc., have adopted SSDs for data storage.

Storage devices may operate based on a plurality of requests and/or commands received from host devices. If the requests and/or commands input to and/or output from the storage devices are biased, performance of the storage devices may be degraded. Accordingly, research is being conducted on how to efficiently handle the requests and/or commands received from the host devices.

SUMMARY

Various example embodiments provide a method of operating a storage device capable of efficiently handling or processing requests from a host device by controlling the number of times occurring program suspensions and/or timings of program suspensions.

Alternatively or additionally, various example embodiments provide a storage device performing the method of operating the storage device.

According to some example embodiments, in a method of operating a storage device, first information may be received from a host device. The first information represents an expectations associated with an operation of the storage device. Second information internally generated based on a plurality of write requests, a plurality of read requests and the operation of the storage device is received. The plurality of write requests and the plurality of read requests are received from the host device. A plurality of program commands and a plurality of read commands are transmitted to a plurality of nonvolatile memories. The plurality of program commands and the plurality of read commands correspond to the plurality of write requests and the plurality of read requests, respectively. Suspension commands are transmitted to at least one of the plurality of nonvolatile memories. The suspension commands are generated based on the first information and the second information and are used to temporarily stop program operations performed based on the plurality of program commands. A number of transmitting the suspension commands and a timing of transmitting the suspension commands are controlled based on the first information and the second information. In response to changing at least one of the plurality of write requests and the plurality of read requests, the number of transmitting the suspension commands and the timing of transmitting the suspension commands are adaptively changed.

According to some example embodiments, a storage device includes a storage controller and a plurality of nonvolatile memories controlled by the storage controller. The storage controller is configured to receive first information from a host device, receive second information internally generated based on a plurality of write requests, a plurality of read requests, and an operation of the storage device, transmit a plurality of program commands and a plurality of read commands to the plurality of nonvolatile memories, and transmit suspension commands to at least one of the plurality of nonvolatile memories. The first information represents an expectation associated with the operation of the storage device. The plurality of write requests and the plurality of read requests are received from the host device. The plurality of program commands and the plurality of read commands correspond to the plurality of write requests and the plurality of read requests, respectively. The suspension commands are generated based on the first information and the second information and are used to temporarily stop program operations performed based on the plurality of program commands. A number of transmitting the suspension commands and a timing of transmitting the suspension commands are controlled based on the first information and the second information. In response to changing at least one of the plurality of write requests and the plurality of read requests, the number of transmitting the suspension commands and the timing of transmitting the suspension commands are adaptively changed.

According to some example embodiments, in a method of operating a storage device including a storage controller and a plurality of nonvolatile memories, the storage device communicates with a host device located outside the storage device. First information is received, by the storage controller, from the host device. The first information includes a throughput condition and a latency condition. The throughput condition is required or expected for the storage device to execute a plurality of write requests and a plurality of read requests received from the host device. The latency condition is required or expected for the storage device to execute the plurality of write requests and the plurality of read requests. Second information including write bandwidth information, read bandwidth information and scheduling overhead information is internally generated, by the storage controller. The write bandwidth information and the read bandwidth information are obtained by monitoring the plurality of write requests and the plurality of read requests. The scheduling overhead information is obtained by monitoring an operation of the storage device. A plurality of program commands and a plurality of read commands are transmitted, by the storage controller, to the plurality of nonvolatile memories such that a plurality of program operations and a plurality of read operations are performed on the plurality of nonvolatile memories. The plurality of program commands and the plurality of read commands correspond to the plurality of write requests and the plurality of read requests, respectively. First suspension commands are transmitted, by the storage controller, to a first nonvolatile memory among the plurality of nonvolatile memories such that the read throttling operation is selectively performed on the first nonvolatile memory. The read throttling operation represents an operation in which first read operations performed on the first nonvolatile memory are restricted while first program operations are being performed on the first nonvolatile memory. The first suspension commands are generated based on the first information and the second information and are used to temporarily stop the first program operations. A number of transmitting the first suspension commands and a timing of transmitting the first suspension commands are controlled based on the first information and the second information. In response to changing at least one of the plurality of write requests and the plurality of read requests, the number of transmitting the first suspension commands and the timing of transmitting the first suspension commands are adaptively changed. The number of transmitting the first suspension commands and the timing of transmitting the first suspension commands are adjusted to satisfy the throughput condition and the latency condition. When transmitting the first suspension commands to the first nonvolatile memory, a first number of suspension commands is calculated based on the first information and the second information. The first number of suspension commands is associated with a maximum number of suspension commands capable of generating per unit time in the first nonvolatile memory. A second number of suspension commands is calculated based on the first number of suspension commands. The second number of suspension commands represents a number of possible suspension commands capable of currently generating in the first nonvolatile memory. A first read command is detected based on the first information and the second information. The first read command represents a command that does not satisfy the latency condition in the first nonvolatile memory. The first suspension commands are selectively transmitted to the first nonvolatile memory based on the second number of suspension commands and the first read command.

In the data backup method, in the storage device, and in the storage system according to some example embodiments, the number and timing of transmitting the suspension commands used for temporarily stopping the program operations may be adaptively and/or dynamically adjusted, based on the first information received from the outside of the storage device and the second information generated inside the storage device. For example, to ensure or guarantee, or to increase the likelihood of satisfaction of the throughput condition of the storage device, it is necessary or desirable to minimize or reduce the occurrence of program suspension operations by performing the read throttling operation. However, when the program suspension operations are unconditionally restricted, the execution of the read request may be delayed, and/or the latency condition may not be satisfied, thereby increasing a read latency. Accordingly, the number and timing of transmitting the suspension commands may be adaptively and/or dynamically controlled to generate only an appropriate number of program suspension operations, such that the read latency does not significantly increase and/or the performance is not or is not likely to be seriously degraded. Accordingly, the storage device may have improved or enhanced performance and/or efficiency.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF SOME EXAMPLE EMBODIMENTS

Figure 1:
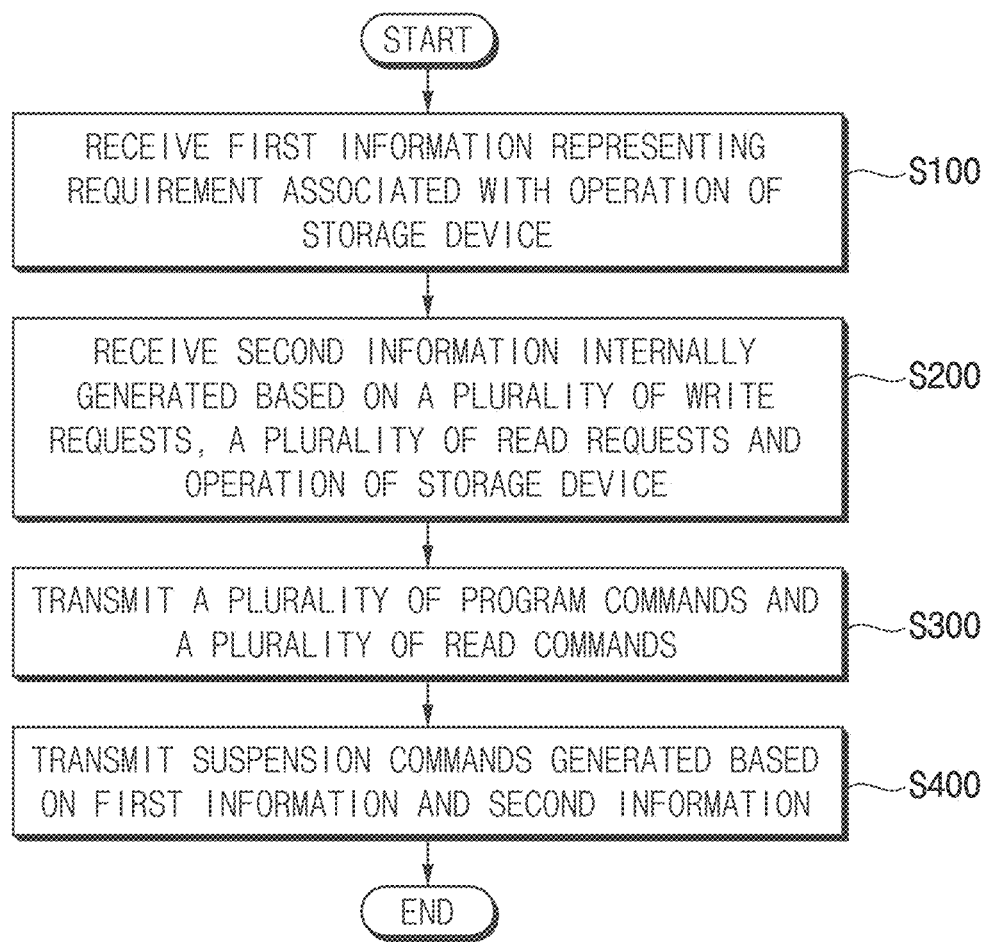
FIG. 1 is a flowchart illustrating a method of operating a storage device according to some example embodiments.

Various example embodiments will be described more fully with reference to the accompanying drawings, in which embodiments are shown. Inventive concepts, however, be embodied in many different forms and should not be construed as limited to the embodiments set forth herein. Like reference numerals refer to like elements throughout this application.

FIG. 1 is a flowchart illustrating a method of operating a storage device according to some example embodiments.

Referring to FIG. 1, a method of operating a storage device according to some example embodiments is performed by a storage device that includes a storage controller and a plurality of memories such as nonvolatile memories. The storage device may operate based on or in response to requests received from a host device that is located outside the storage device. Configurations of the storage device and a storage system including the storage device will be described with reference to FIGS. 2 through 6.

In the method of operating the storage device according to some example embodiments, first information is received from the outside of the storage device, e.g., from the host device (operation S100). The first information represents or indicates a requirement of or an expectation that is associated with or related to an operation of the storage device.

For example, the first information may include performance requirements or expectations and/or quality of service (QoS) requirements or expectations that are associated with the storage device. For example, the first information may include at least one of a throughput condition and a latency condition. The throughput condition may represent a condition required or expected for the storage device to execute a plurality of write requests and a plurality of read requests that are received from the host device, and the latency condition may represent a condition required or expected for the storage device to execute the plurality of write requests and the plurality of read requests. Depending on the contents and/or types of the first information, detailed operations of S400 may be implemented differently, which will be described later.

Second information, which is generated inside the storage device and is different from the first information, is received (operation S200). The second information is internally generated based on the plurality of write requests that are received from the host device, the plurality of read requests that are received from the host device, and the operation of the storage device.

For example, the second information may include information associated with a plurality of input requests, which include the plurality of write requests and the plurality of read requests and are received from the host device, factors associated with performance of the storage device and/or the storage system, and/or the like. For example, the second information may include or be based on at least one of write bandwidth information, read bandwidth information, and timestamp information associated with the plurality of write requests and the plurality of read requests, and may further include or be based on scheduling overhead information associated with the operation of the storage device. Depending on the contents and/or types of the second information, detailed operations of S400 may be implemented differently, which will be described later.

A plurality of program commands and a plurality of read commands are transmitted to the plurality of nonvolatile memories (operation S300). The plurality of program commands and the plurality of read commands correspond to the plurality of write requests and the plurality of read requests, respectively. Program operations may be performed when the plurality of program commands are transmitted, and read operations may be performed when the plurality of read commands are transmitted. In some example embodiments, the plurality of program/read commands may be transmitted depending on a reception order of the plurality of write/read requests. Alternatively or additionally in some example embodiments, to improve performance and/or efficiency, the plurality of program/read commands may be transmitted by scheduling the plurality of write/read requests, for example regardless or irrespective of the reception order of the plurality of write/read requests.

For example, the plurality of write requests and the plurality of read requests may be provided with logical addresses, and the plurality of program commands and the plurality of read commands may be provided with physical addresses. The logical address may be or may include or be included in an address of a storage space (e.g., a logical storage space) recognized by the host device, and the physical address may be or may include or be included in an address of an actual storage space (e.g., a physical storage space) included in the nonvolatile memory of the storage device. Typically, the host device may manage data by recognizing or considering that storage spaces in the storage device are sequentially arranged from a first storage space to a last storage space; however, an actual, physical arrangement of storage spaces in the storage device may be different from the arrangement of the storage spaces in the storage device recognized by the host device. Locations and/or sequences of data recognized by the host device may also be different from locations and/or sequences of data actually stored in the storage device. Thus, when a specific storage space of the storage device is to be accessed, the logical address received from the host device may be translated or converted into the physical address. For example, a mapping table may be used for the logical-to-physical address translation.

For example, when a write request, a logical write address, and write data are received from the host device, a program command and a physical program address may be generated based on the write request and the logical write address, and the write data may be programmed or stored into a specific nonvolatile memory based on the program command and the physical program address. The series of operations described above may be referred to as a write operation from the viewpoint of the host device, and as a program operation from the viewpoint of the storage device. Herein, the two terms (e.g., the write operation and the program operation) described above may be used interchangeably to describe substantially the same or similar operations.

For example, when a read request and a logical read address are received from the host device, a read command and a physical read address may be generated based on the read request and the logical read address, and read data may be retrieved or obtained from a specific nonvolatile memory and may be transmitted to the host device based on the read command and the physical read address. The series of operations described above may be referred to as a read operation.

For example, a request received from the host device may be referred to as a host command, and the write request and the read request may be referred to as a write host command and a read host command, respectively. For example, a command transmitted to the non-volatile memory may be referred to as a memory command so as to be distinguished from the host command, and the program command and the read command may be referred to as a program memory command and a read memory command, respectively. In some example embodiments, the write request and the read request may be collectively referred to as data input/output (I/O) requests, and the program command and the read command may be collectively referred to as data I/O commands.

Suspension commands are transmitted to at least one of the plurality of nonvolatile memories (operation S400). The suspension commands may be generated based on the first information and the second information, and may be used to stop, e.g. to temporarily stop the program operations performed based on the plurality of program commands. When the suspension command is transmitted, the program operation may be temporarily stopped or suspended, and this may be referred to as a program suspension operation. An amount of time to which the program operations are suspended may be determined, e.g., be predetermined or dynamically determined, and/or may be based on other events such as other signals generated internally, e.g., from the storage device, and/or externally, e.g. generated from the host device.

When operation S400 is performed, the number of transmitting (or generating) of the suspension commands and/or a timing of the transmitting (or generating) the suspension commands may be adaptively and/or dynamically controlled based on the first information and the second information. Alternatively or additionally, when at least one of the plurality of write requests and the plurality of read requests received from the host device is changed, the number of transmitting the suspension commands and/or the timing of transmitting the suspension commands may be adaptively and/or dynamically changed.

In some example embodiments, a read throttling operation may be selectively performed or applied based on the number of transmitting the suspension commands and/or the timing of transmitting the suspension commands. The read throttling operation may represent an operation in which a first read operation performed on a first nonvolatile memory among the plurality of nonvolatile memories is restricted (e.g. constrained or limited or inhibited) while a first program operation is being performed on the first nonvolatile memory.

For example, when the first read operation is to be performed based on a first read command corresponding to a first read request while the first program operation is being performed based on a first program command corresponding to a first write request, a timing of transmitting a first suspension command and the first read command may be adjusted based on the first information and the second information, rather than immediately transmitting the first suspension command and the first read command to the first nonvolatile memory. The first suspension command may be or include or be included in a command used to temporarily stop the first program operation.

Detailed examples of operation S400 and controlling the program suspension operation will be described with reference to FIGS. 7 through 16.

In some example embodiments, up to all of the operations S100, S200, S300 and S400 may be performed by the storage controller.

While the storage device is operating, write requests and read requests may be mixedly input to the storage device. For example, sequential write operations and random read operations may be requested together. Even under such circumstance, the storage device should operate to increase or maximize performance by utilizing many or up to the maximum available resources.

Conventionally, when a new read request is received, a read command corresponding to the received read request is transmitted to a nonvolatile memory regardless of whether a program operation is being performed on the nonvolatile memory. In addition, when the read command is transmitted while a program operation is being performed, a program suspension operation for temporarily stopping the program operation was performed. When read requests are indiscriminately transmitted, program suspension operations are frequently caused, and there are problems in that write/read performance of the storage device is degraded due to the frequent program suspension operations.

In the method of operating the storage device according to some example embodiments, the number and/or timing of transmitting the suspension commands used for temporarily stopping the program operations may be adaptively and/or dynamically adjusted, based on the first information received from the outside of the storage device and the second information generated inside the storage device. For example, to ensure or guarantee, or to help improve upon, the throughput condition of the storage device, it is necessary or desirable to minimize or reduce the occurrence of program suspension operations by performing the read throttling operation. However, when the program suspension operations are unconditionally restricted, the execution of the read request may be delayed, and the latency condition may not be satisfied, thereby increasing a read latency (or tail latency). Therefore, the number and timing of transmitting the suspension commands may be adaptively and/or dynamically controlled to generate or occur only an appropriate number of program suspension operations such that the read latency does not highly increase and the performance is not seriously degraded. Accordingly, the storage device may have improved or enhanced performance and efficiency.

Figure 2:
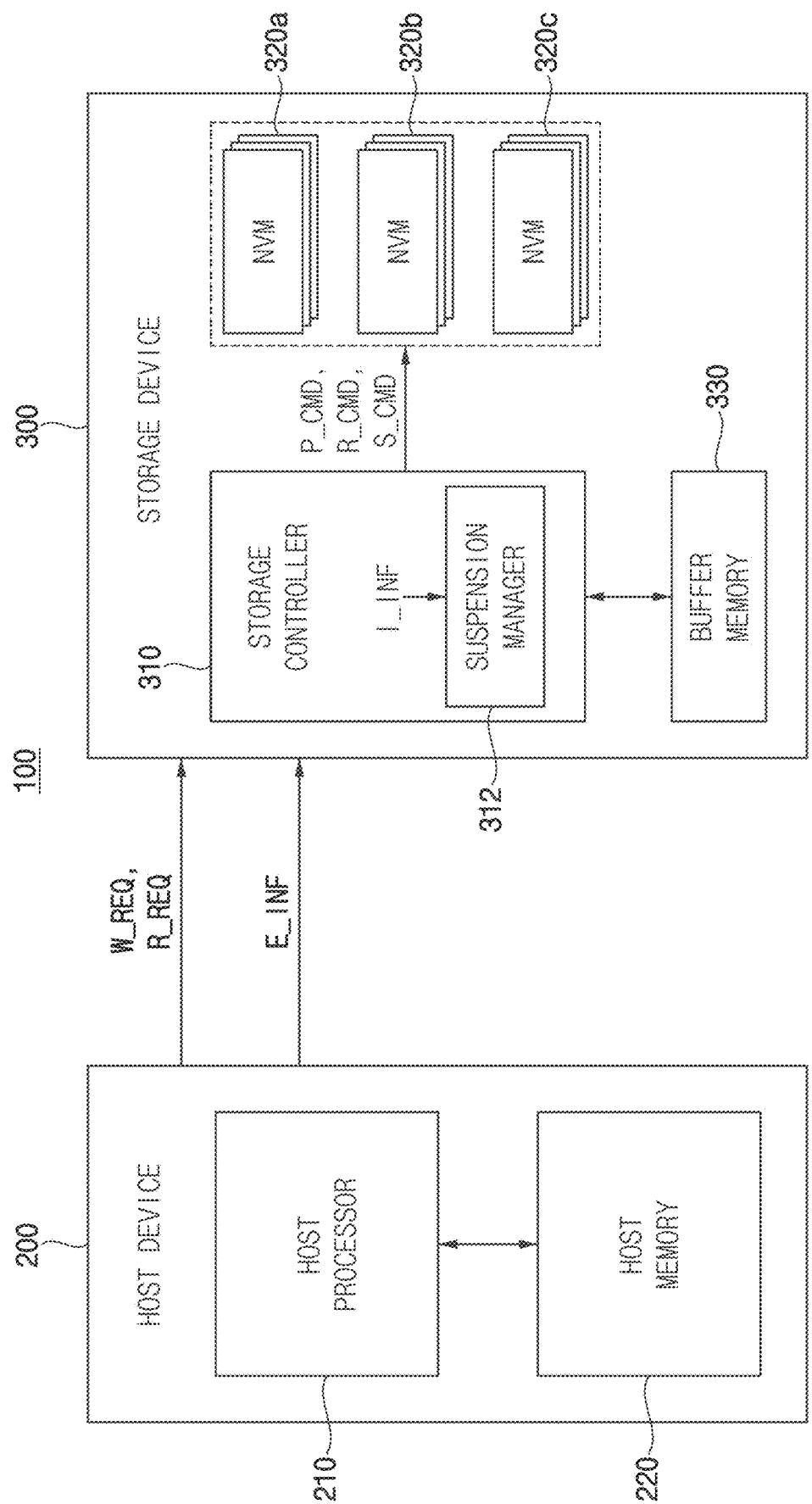
FIG. 2 is a block diagram illustrating a storage device and a storage system including the storage device according to some example embodiments.

FIG. 2 is a block diagram illustrating a storage device and a storage system including the storage device according to some example embodiments.

Referring to FIG. 2, a storage system 100 includes a host device 200 and a storage device 300.

The host device 200 controls up to the overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the storage device 300 at the operating system level. The host memory 220 may store instructions and/or data that are executed and/or processed by the host processor 210.

The storage device 300 is accessed by the host device 200. The storage device 300 may include a storage controller 310, a plurality of nonvolatile memories 320a, 320b, and 320c, and a buffer memory 330.

The storage controller 310 may control an operation of the storage device 300. For example, based on requests (e.g., write requests W_REQ and/or read requests R_REQ) received from the host device 200, the storage controller 310 may control the operation (e.g., write operations and read operations) of the storage device 200, and may control an operation of exchanging data (e.g., receiving/storing write data and transmitting read data) between the host device 200 and the storage device 300. For example, the storage controller 310 may generate commands (e.g., program commands P_CMD, read commands R_CMD, and suspension commands S_CMD) for controlling operations (e.g., program operations and read operations) of the plurality of nonvolatile memories 320a to 320c, may transmit the commands to the plurality of nonvolatile memories 320a to 320c, and may control an operation of exchanging data (e.g., transmitting/programming write data and receiving read data) with the plurality of nonvolatile memories 320a to 320c.

The plurality of nonvolatile memories 320a to 320c may be controlled by the storage controller 310, and may store a plurality of data. For example, the plurality of nonvolatile memories 320a to 320c may store one or more of the meta data, various user data, or the like.

Each nonvolatile memory may be disposed on a respective one semiconductor die, and may form a respective one nonvolatile memory chip; however, example embodiments are not limited thereto. In addition, the storage device 300 may include a plurality of memory packages, and each of the plurality of memory packages may include at least one of the plurality of nonvolatile memories 320a to 320c; however, example embodiment are not limited thereto. For example, each of the plurality of nonvolatile memories 320a to 320c may be included in a respective one of the plurality of memory packages.

In some example embodiments, each of or at least one of the plurality of nonvolatile memories 320a to 320c may include a NAND flash memory. Alternatively or additionally, each of or at least one of the plurality of nonvolatile memories 320a to 320c may include one or more of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of nonvolatile memories 320a to 320c. For example, the buffer memory 330 may include at least one of various volatile memories, e.g., a static random access memory (SRAM) and/or a dynamic random access memory (DRAM), and/or the like.

The storage controller 310 may include a suspension manager 312 to perform the method of operating the storage device according to some example embodiments described with reference to FIG. 1. The suspension manager 312 may receive first information E_INF from the host device 200 outside the storage device 300, and may receive second information I_INF generated inside the storage device 300. The suspension manager 312 may generate the suspension commands S_CMD based on the first information E_INF and the second information I_INF, and may adaptively and/or dynamically control the number and timing of transmitting the suspension commands S_CMD. A configuration and operation of the suspension manager 312 will be described with reference to FIGS. 3, 5 and 6.

In some example embodiments, the storage device 300 may be or include or be included in one or more of a solid state drive (SSD), a universal flash storage (UFS), a multimedia card (MMC) or an embedded multi-media card (eMMC). Alternatively or additionally, the storage device 300 may be or include or be included one or more of a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, one or more of an advanced technology attachment (ATA), a serial ATA (SATA), a parallel ATA (PATA), a small computer small interface (SCSI), a serial attached SCSI (SAS), a peripheral component interconnect express (PCIe), a nonvolatile memory express (NVMe), a UFS, an eMMC, a compute express link (CXL), or the like. The storage device 300 may use a block accessible address space corresponding to an access size of the plurality of nonvolatile memories 320a to 320c to provide the block accessible interface to the host device 200, for allowing the access by units of a memory block with respect to data stored in the plurality of nonvolatile memories 320a to 320c.

In some example embodiments, the storage system 100 may be or include or be included in any computing system, such as a personal computer (PC), a server computer, a data center, a workstation, a digital television, a set-top box, a navigation system, etc. Alternatively or additionally, the storage system 100 may be or include or be included in any mobile system, such as one or more of a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

Figure 3:
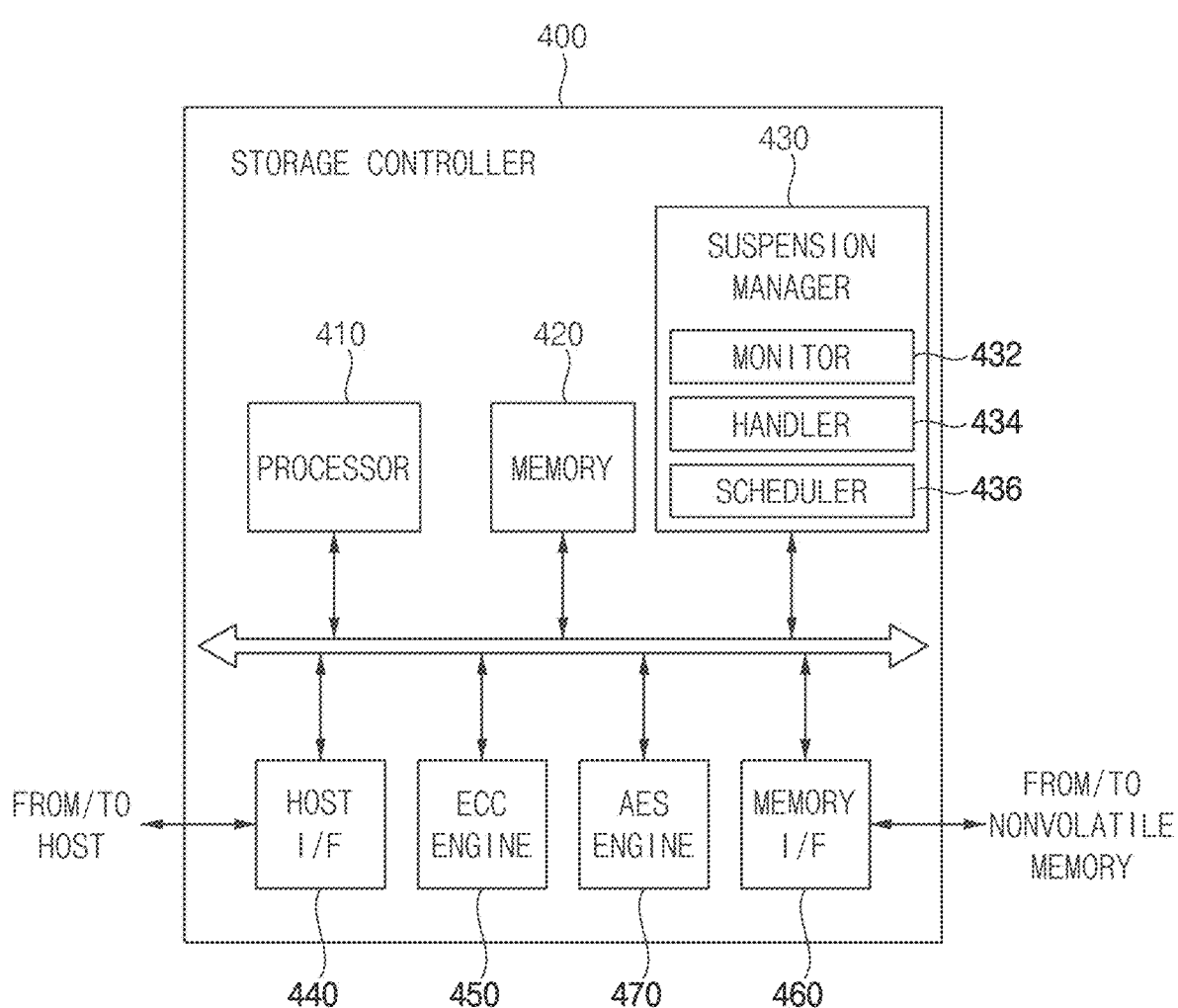
FIG. 3 is a block diagram illustrating an example of a storage controller included in a storage device according to some example embodiments.

FIG. 3 is a block diagram illustrating an example of a storage controller included in a storage device according to some example embodiments.

Referring to FIG. 3, a storage controller 400 may include a processor 410, a memory 420, a suspension manager 430, a host interface (I/F) 440, an error correction code (ECC) engine 450, a memory interface 460 and an advanced encryption standard (AES) engine 470.

The processor 410 may control up to an operation of the storage controller 400 in response to a request received via the host interface 440 from a host device (e.g., the host device 200 in FIG. 2). For example, the processor 410 may control an operation of a storage device (e.g., the storage device 300 in FIG. 2), and may control respective components of the storage device by employing firmware for operating the storage device.

The memory 420 may store instructions and data executed and processed by the processor 410. For example, the memory 420 may be implemented with a volatile memory, such as one or more of a DRAM, a SRAM, a cache memory, or the like.

The suspension manager 430 may be implemented to perform the method of operating the storage device according to some example embodiments, and may be substantially the same as the suspension manager 312 in FIG. 2. The suspension manager 430 may include a monitor 432, a handler 434 and a scheduler 436. The monitor 432 may internally perform a monitoring operation for generating the second information I_INF. The handler 434 may perform a program suspension control operation for adjusting the number and timing of transmitting the suspension commands S_CMD. The scheduler 436 may generate the suspension commands S_CMD under a control of the handler 434.

The ECC engine 450 for error correction may perform coded modulation using one or more of a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., and/or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be or include a SCSI and/or a SAS interface. Alternatively or additionally, the bus format of the host device may be or include one or more of a USB, a PCIe, an ATA, a PATA, a SATA, an NVMe, a CXL, etc., format.

The memory interface 460 may exchange data with a nonvolatile memory (e.g., the nonvolatile memories 320a to 320c in FIG. 2). The memory interface 460 may transfer data to the nonvolatile memory, or may receive data read from the nonvolatile memory. In some example embodiments, the memory interface 460 may be connected to the nonvolatile memory via one (e.g. only one) channel. In some example embodiments, the memory interface 460 may be connected to the nonvolatile memory via two or more channels. For example, the memory interface 460 may be configured to comply with a standard protocol, such as Toggle and/or open NAND flash interface (ONFI).

The AES engine 470 may perform at least one of an encryption operation and a decryption operation on data input to the storage controller 400 by using a symmetric-key algorithm. The AES engine 470 may include an encryption module and a decryption module. For example, the encryption module and the decryption module may be implemented as separate modules. As another example, one module capable of performing both encryption and decryption operations may be implemented in the AES engine 470.

Figure 4:
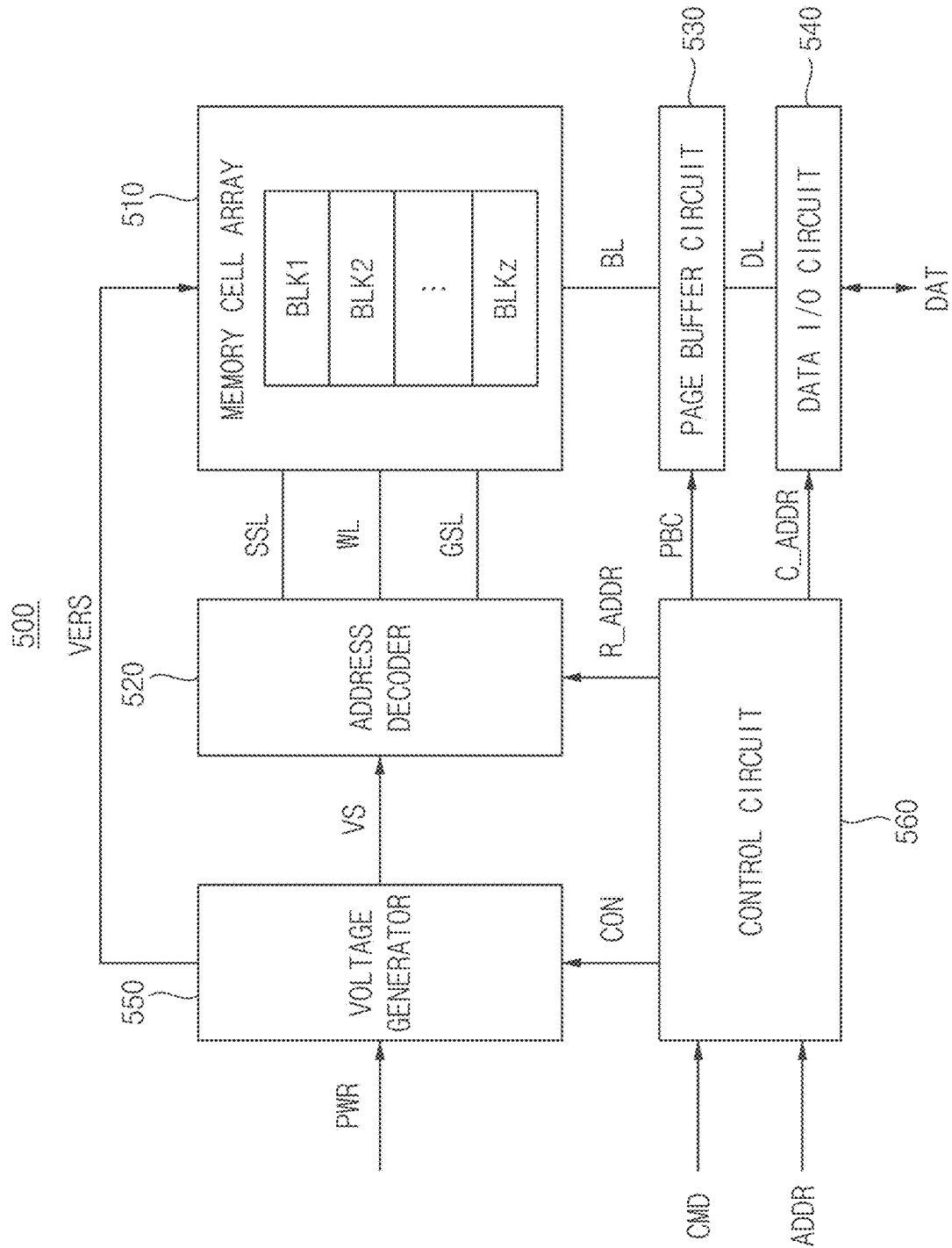
FIG. 4 is a block diagram illustrating an example of a nonvolatile memory included in a storage device according to some example embodiments.

FIG. 4 is a block diagram illustrating an example of a nonvolatile memory included in a storage device according to some example embodiments.

Referring to FIG. 4, a nonvolatile memory 500 may include a memory cell array 510, an address decoder 520, a page buffer circuit 530, a data input/output (I/O) circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure and/or a three-dimensional (3D) vertical array structure. The 3D vertical array structure may include vertical cell strings that are vertically oriented such that at least one memory cell is located over another memory cell. The at least one memory cell may comprise a charge trap layer; however, example embodiments are not limited thereto. The following patent documents, which are hereby incorporated by reference in their entireties, describe configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Pub. No. 2011/0233648.

The control circuit 560 may receive a command CMD and an address ADDR from an outside (e.g., from the storage controller 310 in FIG. 2), and may control one or more of erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation; however, example embodiments are not limited thereto. Each erase loop may include an erase operation and an erase verification operation. The read operation may include a normal read operation and data recovery read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required or used for an operation of the nonvolatile memory 500 based on a power PWR and on the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required or used for the data erase operation based on the power PWR and on the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. For example, the page buffer circuit 530 may operate as a write driver and/or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 and/or may provide the data DAT from the memory cell array 510 to the outside of the nonvolatile memory 500, based on the column address C_ADDR.

Figure 5:
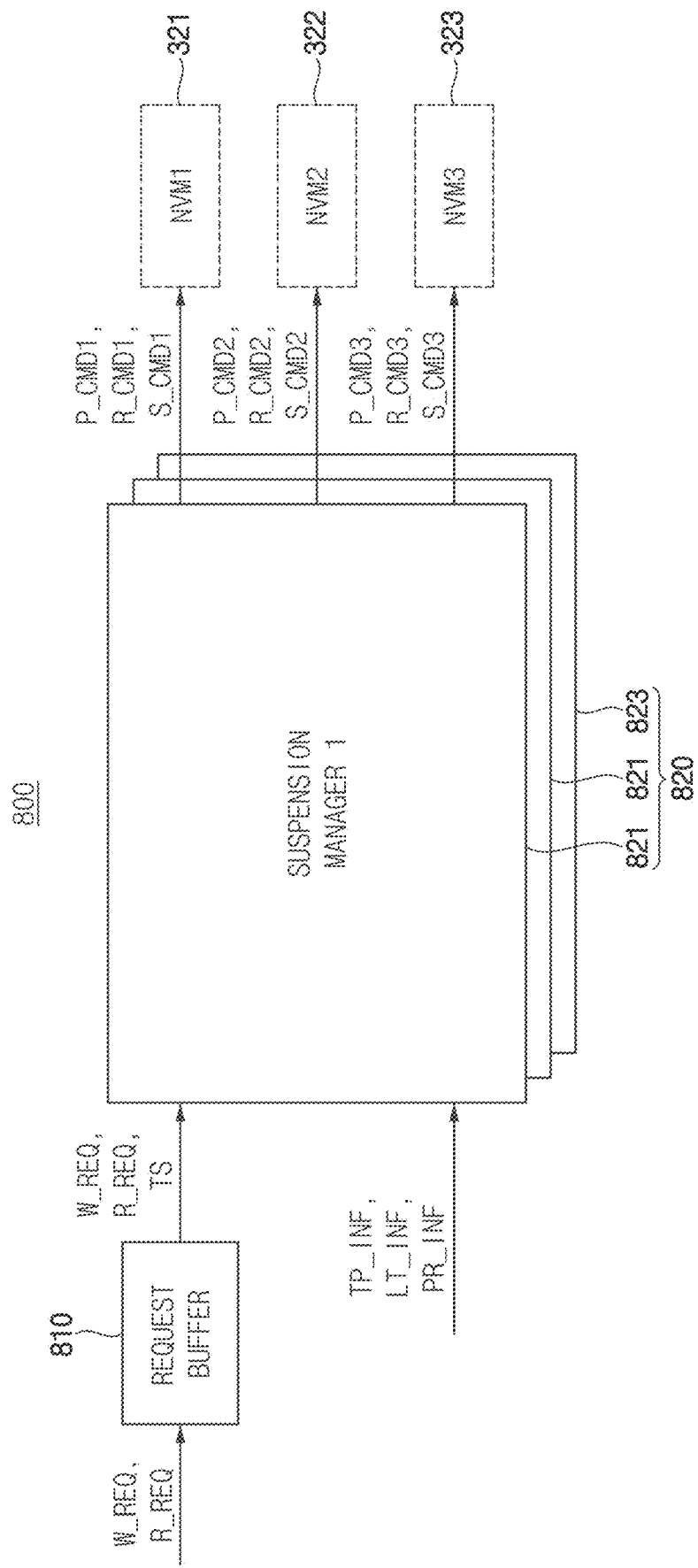
FIG. 5 is a block diagram illustrating an example of a storage controller of FIG. 3.

FIG. 5 is a block diagram illustrating an example of a storage controller of FIG. 3.

Referring to FIG. 5, a storage controller 800 may include a request buffer 810 and a plurality of suspension managers 820. For convenience of illustration, components less related to the program suspension control operation are omitted in FIG. 5.

The request buffer 810 may receive a plurality of write requests W_REQ and a plurality of read requests R_REQ from the host device 200, and may store (e.g., buffer or queue) the plurality of write requests W_REQ and the plurality of read requests R_REQ. The request buffer 810 may be referred to as one or more of a host command buffer, a request queue, a host command queue, etc. For example, the request buffer 810 may include a ring buffer. For example, the request buffer 810 may include a submission buffer (or queue) and a completion buffer (or queue).

The request buffer 810 may output the plurality of write requests W_REQ and the plurality of read requests R_REQ, and may also output timestamps TS associated with the write requests W_REQ and the read requests R_REQ. For example, the timestamps TS may include time information such as input time points at which the write requests W_REQ and the read requests R_REQ are received and/or execution time points at which the write requests W_REQ and the read requests R_REQ are executed.

Each of the plurality of suspension managers 820 may perform the program suspension control operation on each die (or each chip). Each of the plurality of suspension managers 820 may be referred to as a die (or die-level) suspension manager.

For example, the plurality of suspension managers 820 may include a first suspension manager 821 that performs the program suspension control operation on a first nonvolatile memory 321, a second suspension manager 822 that performs the program suspension control operation on a second nonvolatile memory 322, and a third suspension manager 823 that performs the program suspension control operation on a third nonvolatile memory 323. The first suspension manager 821 may transmit first program commands P_CMD1, first read commands R_CMD1, and first suspension commands S_CMD1 to the first nonvolatile memory 321. The second suspension manager 822 may transmit second program commands P_CMD2, second read commands R_CMD2, and second suspension commands S_CMD2 to the second nonvolatile memory 322. The third suspension manager 823 may transmit third program commands P_CMD3, third read commands R_CMD3, and third suspension commands S_CMD3 to the third nonvolatile memory 323.

The plurality of suspension managers 820 may receive the first information E_INF from the host device 200 located outside the storage device 300, may internally generate the second information I_INF based on the plurality of write requests W_REQ, the plurality of read requests R_REQ and the timestamps TS, and may perform the program suspension control operations based on the first information E_INF and on the second information I_INF.

For example, the first information E_INF may include or be based on at least one of a throughput condition TP_INF, a latency condition LT_INF and priority information PR_INF. For example, the throughput condition TP_INF may include information associated with performance of write/read operations (e.g., bandwidth, occupancy time, etc.), information associated with performance variation range, and/or the like. For example, the latency condition LT_INF may include information associated with read latency (e.g., time required or expected from input/execution of a read request to output of read data), and/or the like. For example, the priority information PR_INF may include information about which condition is to be selected in a situation where the throughput condition TP_INF and the latency condition LT_INF cannot be simultaneously satisfied. In some example embodiments, the priority information PR_INF may be set and/or determined in advance at an initial operation time or may be changed in real time or during runtime while the storage device is operating. In some example embodiments, the priority information PR_INF may be externally set and/or changed (e.g., based on a user control signal received from the outside).

Figure 6:
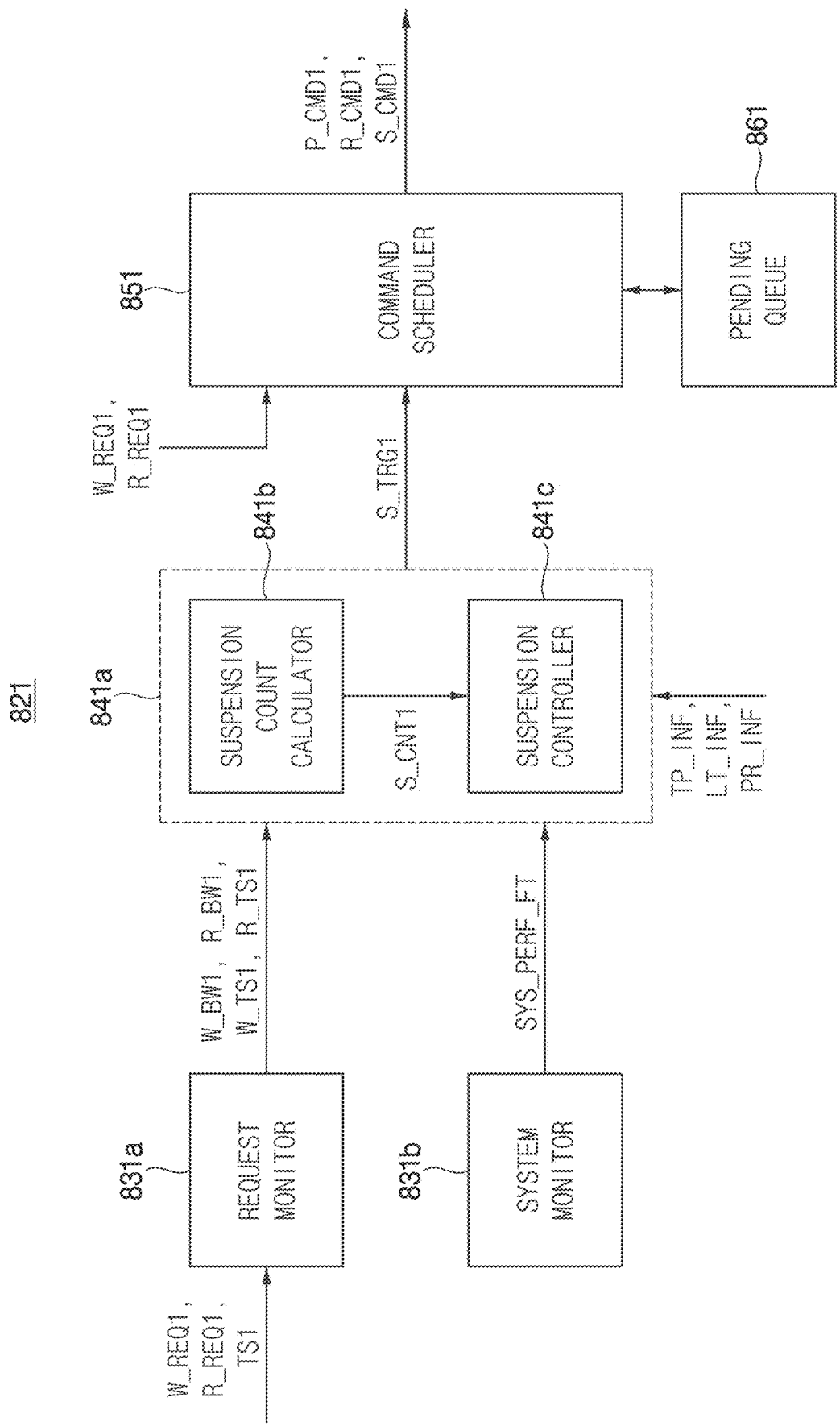
FIG. 6 is a block diagram illustrating an example of a first suspension manager included in a storage controller of FIG. 5.

FIG. 6 is a block diagram illustrating an example of a first suspension manager included in a storage controller of FIG. 5.

Referring to FIG. 6, a first suspension manager 821 may include a request monitor 831$a$, a system monitor 831$b$, a suspension handler 841$a$, a command scheduler 851 and a pending queue 861.

The request monitor 831$a$ and the system monitor 831$b$ may correspond to the monitor 432 in FIG. 3, and may internally generate the second information I_INF by performing the monitoring operation. For example, the second information I_INF may include at least one of information associated with input requests and system performance factors.

For example, the request monitor 831$a$ may monitor first write requests W_REQ1 and first read requests R_REQ1 for the first nonvolatile memory 321, may monitor first timestamps TS1 associated with the first write requests W_REQ1 and first read requests R_REQ1, and may generate and/or obtain the information associated with input requests. For example, the information associated with input requests may include at least one of first write bandwidth information W_BW1, first read bandwidth information R_BW1, first write request input time information W_TS1 and first read request input time information R_TS1. The system monitor 831$b$ may monitor (e.g. continuously and/or periodically monitor) the operation of the storage device 300, and may generate and/or obtain the system performance factors. For example, the system performance factors may include scheduling overhead information SYS_PERF_FT.

The suspension handler 841$a$ may correspond to the handler 434 in FIG. 3, and may generate a first suspension trigger signal S_TRG1 by performing the program suspension control operation based on the first information E_INF and the second information I_INF. The suspension handler 841$a$ may include a suspension count calculator 841$b$ and a suspension controller 841$c$.

The suspension count calculator 841$b$ may calculate a number corresponding to the maximum number of suspension commands that can be generated per unit time in the first nonvolatile memory 321 and the number of possible suspension commands that can be currently generated in the first nonvolatile memory 321, and may generate a first suspension count signal S_CNT1 representing or associated with the maximum number of suspension commands and the number of possible suspension commands. For example, the current write/read bandwidth, the other performance factors and the throughput requirements may be received or input, available resources may be calculated based thereon, and then the number of possible program suspensions may be calculated based thereon. For example, the available resources (e.g., time) may be calculated considering the performance loss allowed by the throughput requirements, excluding resources for current write/read bandwidth and the other performance factors consuming resources (e.g., scheduling overhead) from among all resources. In addition, the number of currently possible program suspensions may be calculated by recording the number of previously issued program suspensions and the accumulated number of program suspensions.

The suspension controller 841$c$ may adjust and/or restrict the number and timing of transmitting the first suspension commands S_CMD1, and may generate a first suspension trigger signal S_TRG1 for adjusting or restricting the number and timing of transmitting the first suspension commands S_CMD1. For example, when a specific nonvolatile memory is being programmed, the timing of generating program suspensions may be adjusted with reference to latency requirements, input time of each read request, and information of the number of possible program suspensions. For example, the input time of each read command may be measured, and a program suspension may be generated at a time point before the tail latency does not exceed. Alternatively or additionally, by considering the tail latency, the same program suspension interval may be maintained as much as possible.

The command scheduler 851 may correspond to the scheduler 436 in FIG. 3, may generate first program commands P_CMD1, first read commands R_CMD1 and the first suspension commands S_CMD1 based on the first write requests W_REQ1, the first read requests R_REQ1 and the first suspension trigger signal S_TRG1, and may transmit the first program commands P_CMD1, the first read commands R_CMD1 and the first suspension commands S_CMD1 to the first nonvolatile memory 321. For example, when a read request is received or input, it may be checked whether the nonvolatile memory is being programmed. When the program operation is not being performed, the read request may be executed and a read command corresponding to the read request may be transmitted. When the program operation is being performed, it may be checked whether the program suspension is currently possible. When the program suspension is currently possible, corresponding read request and all pending read requests may be executed. When the program suspension is currently impossible, corresponding read request may be stored in the pending queue 861. In other words, when the read throttling operation is performed and some of the first read commands R_CMD1 are not transmitted, some read commands that are not transmitted may be temporarily stored in the pending queue 861.

Figure 7:
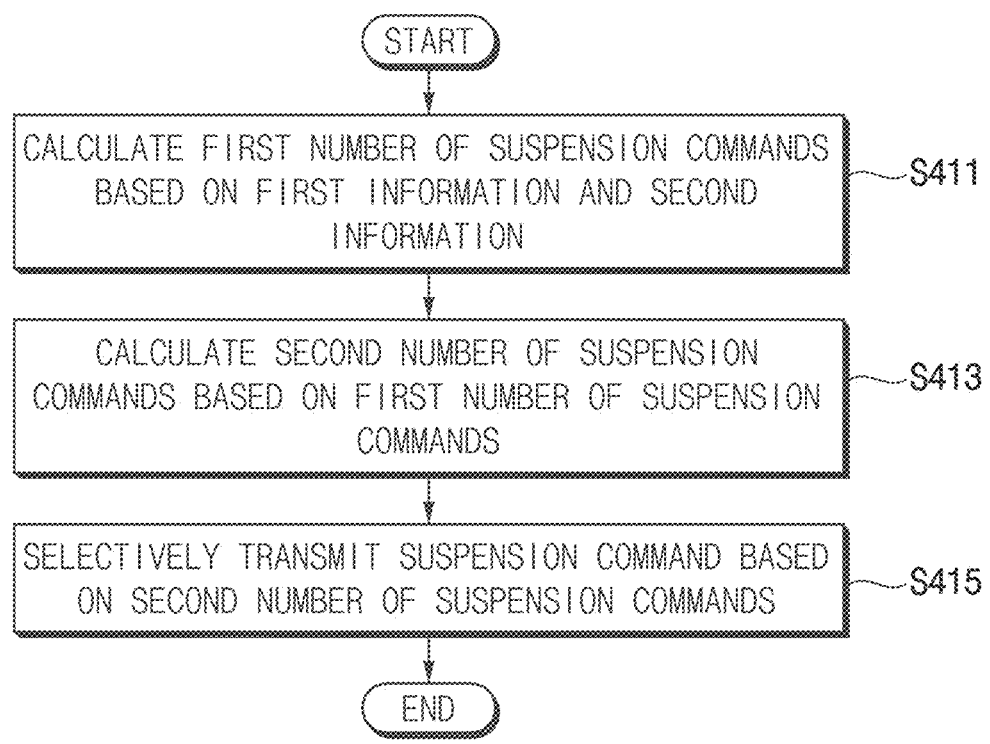
FIG. 7 is a flowchart illustrating an example of transmitting suspension commands to at least one of a plurality of nonvolatile memories in FIG. 1.

FIG. 7 is a flowchart illustrating an example of transmitting suspension commands to at least one of a plurality of nonvolatile memories in FIG. 1.

Referring to FIGS. 1 and 7, in operation S400, the first information may include a throughput condition required or expected for the storage device to execute the plurality of write requests and the plurality of read requests. In this example, the number of transmitting the suspension commands and the timing of transmitting the suspension commands may be adjusted to satisfy the throughput condition.

For example, a first number of suspension commands may be calculated based on the first information and the second information (operation S411). The first number of suspension commands may represent a maximum number of suspension commands that can be generated or capable of generating per unit time in a first nonvolatile memory. A second number of suspension commands may be calculated based on the first number of suspension commands (operation S413). The second number of suspension commands may represent a number of possible suspension commands that can be currently generated or capable of currently generating in the first nonvolatile memory. A first suspension command may be selectively transmitted to the first nonvolatile memory based on the second number of suspension commands (operation S415).

FIG. 7 illustrates an example where the number of program suspensions is restricted to satisfy the throughput condition in consideration of resource circumstance. For example, QoS information, e.g., information associated with performance variation range and required or expected write/read bandwidth, may be received from the host device, the amount of write/read requests received from the host device and generated in the storage device may be measured, the allowable throughput may be calculated by checking factors affecting the throughput when a situation that does not satisfy the required or expected throughput condition is detected, and then the maximum number of program suspensions capable of generating per unit time may be calculated. In addition, the number of possible suspension commands capable of currently generating may be calculated based on the maximum number of program suspensions capable of generating per unit time, and it may be determined whether a new read request is transmitted to the nonvolatile memory or is stored in the pending queue when the program operation is being performed. Accordingly, the number of program suspension may be restricted depending on the throughput requirements, and the QoS requirements may be satisfied. In addition, the number of program suspension may be adjusted based on the QoS requirements (e.g., die time fairness, bandwidth limit, variation range, etc.) that are changed in real time or during runtime.

Figure 8:
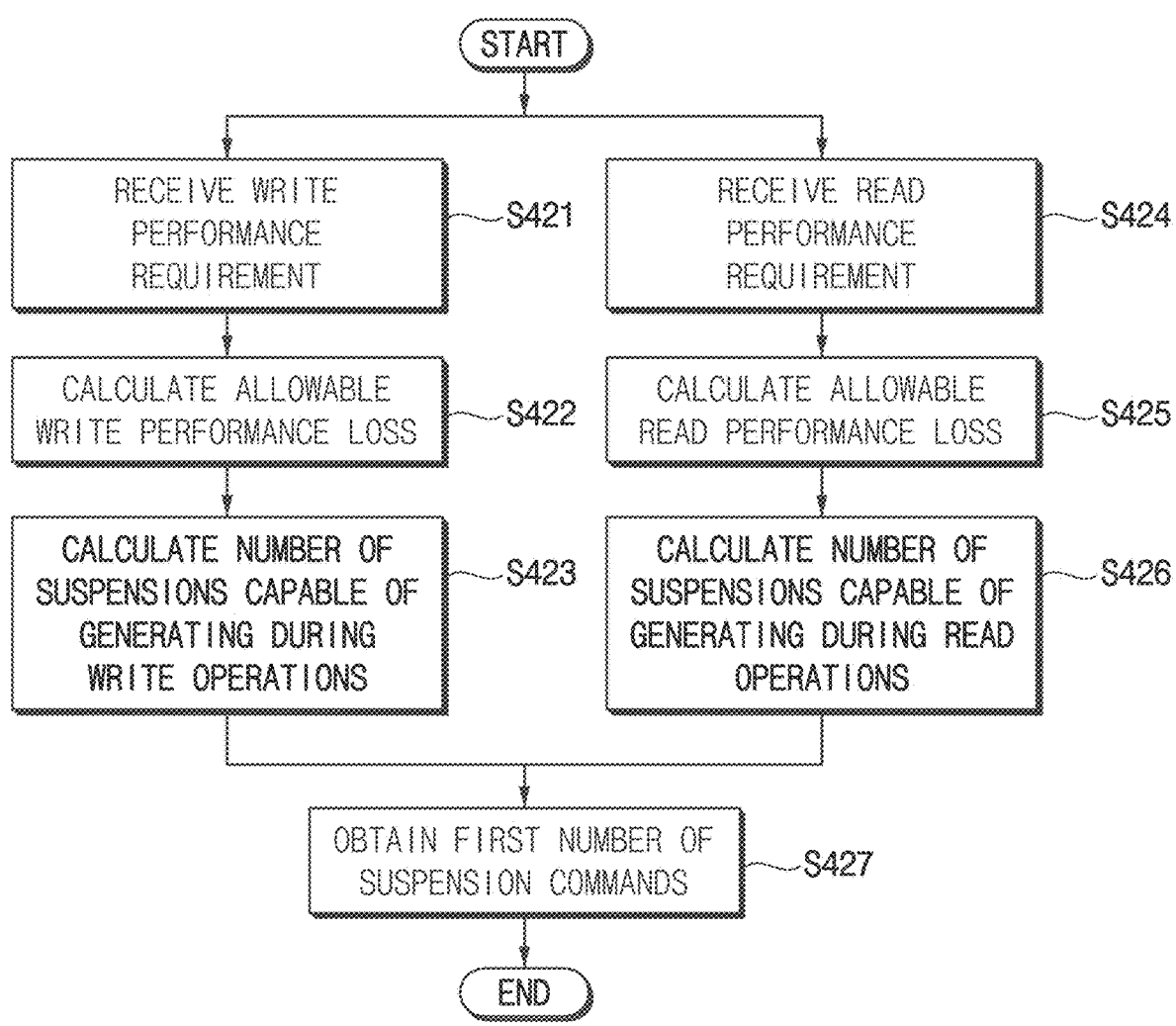
FIGS. 8, 9A and 9B are flowcharts illustrating examples of calculating a first number of suspension commands in FIG. 7.
Figure 9A:
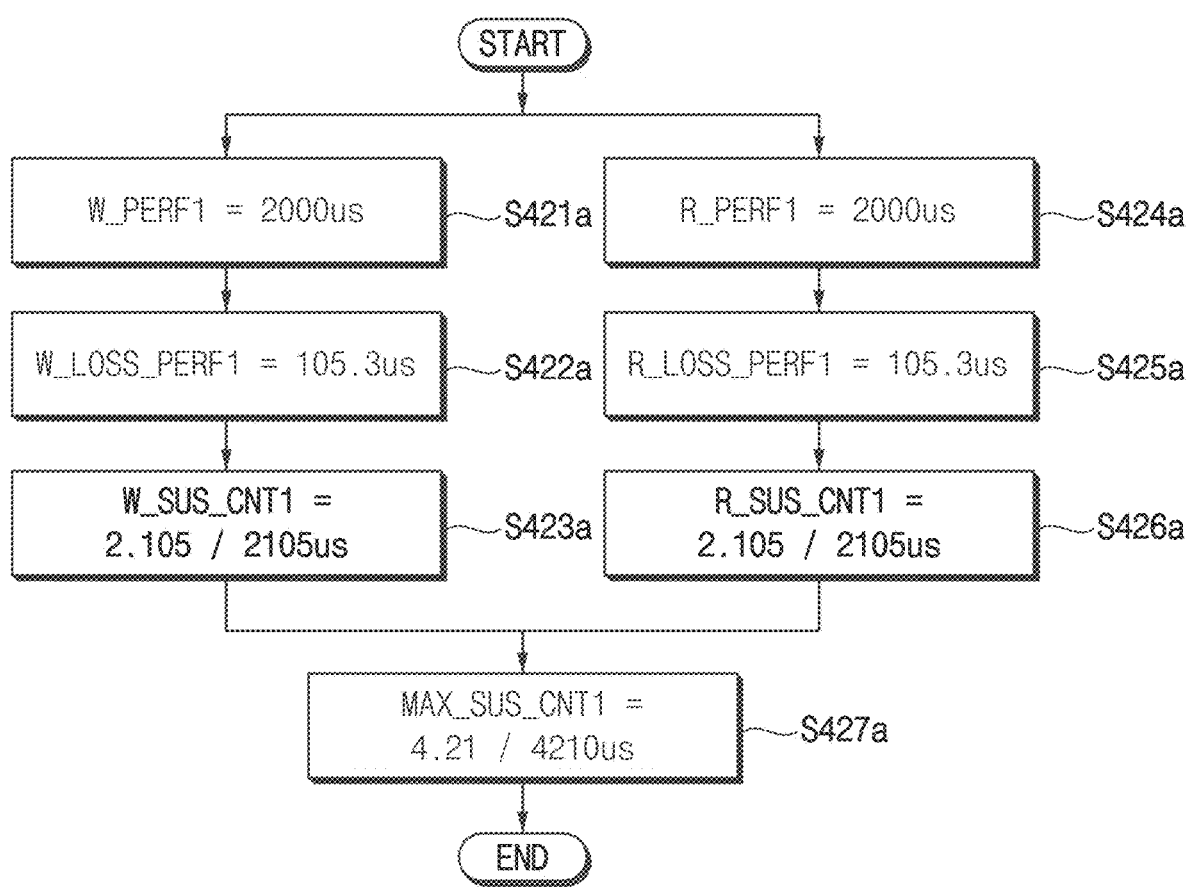
Figure 9B:
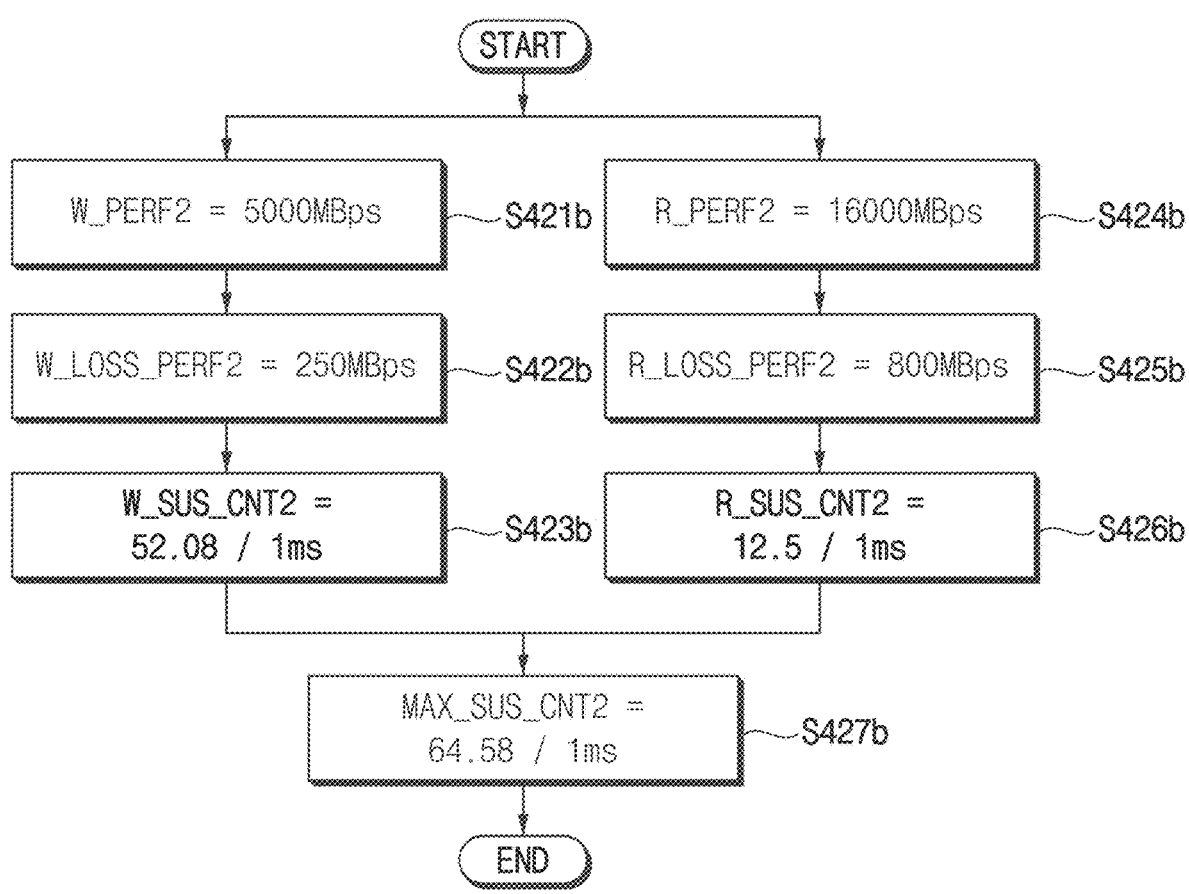

FIGS. 8, 9A and 9B are flowcharts illustrating examples of calculating a first number of suspension commands in FIG. 7.

Referring to FIGS. 7 and 8, in operation S411, a third number of suspension commands representing a maximum number of suspension commands capable of generating while the plurality of write requests are executed may be calculated. For example, write performance requirement may be received (operation S421), allowable write performance loss may be calculated (operation S422), and the number (e.g., the third number) of suspensions capable of generating during write operations may be calculated (operation S423).

Similarly, a fourth number of suspension commands representing a maximum number of suspension commands capable of generating while the plurality of read requests are executed may be calculated. For example, read performance requirement may be received (operation S424), allowable read performance loss may be calculated (operation S425), and the number (e.g., the fourth number) of suspensions capable of generating during read operations may be calculated (operation S426).

Thereafter, the first number of suspension commands may be obtained based on the third number of suspension commands and the fourth number of suspension commands (operation S427). For example, the first number of suspension commands may be obtained by adding the third number of suspension commands and the fourth number of suspension commands.

Referring to FIG. 9A, an example of calculating the first number of suspension commands is illustrated. FIG. 9A illustrates an example where write requests and read requests are mixedly input to a nonvolatile memory, it is required or expected that the nonvolatile memory is occupied by the write requests and the read requests at a predetermined ratio, and it is required or expected that time during which the nonvolatile memory is occupied by the write requests and/or the read requests is satisfied within a predetermined tolerance.

For example, the write requests and the read requests may be sufficiently input such that NAND utilization becomes about 100% (at NAND bound), the write requests and the read requests may occupy the nonvolatile memory at a ratio of about 1:1, and each may have a tolerance of about 5%. Assuming that one write request is executed and time required or expected to execute one write request is about 2000 us (operation S421a: W_PERF1=2000 us), one read request may also be executed and time required or expected to execute one read request may also be about 2000 us (operation S424a: R_PERF1=2000 us). Assuming that loss of about 5% is tolerated for each of one write request and one read request, time loss of about 105.3 us (=(2000 us*5)/(100−5)) due to suspensions may be tolerated during time for one write request of about 2000 us (operation S422a: W_LOSS_PERF1=105.3 us), time loss of about 105.3 us due to suspensions may also be tolerated during time for one read request of about 2000 us (operation S425a: R_LOSS_PERF1=105.3 us), and time loss of about 210 us due to suspensions may be tolerated during total time of about 4000 us. Assuming that time required or expected to perform one program suspension is about 50 us, about 2.105 (=105.3 us/50 us) program suspensions may be allowed within time of about 2105 us (=2000 us+105.3 us) during one write request (operation S423a: W_SUS_CNT1=2.105/ 2105 us), and about 2.105 program suspensions may be allowed within time of about 2105 us during one read request (operation S426a: R_SUS_CNT1=2.105/2105 us), As a result, about 4.21 program suspensions may be allowed within total time of about 4210 us by adding results of operations S423a and S426a (operation S427a: MAX_SUS_ CNT1=4.21/4210 us).

Referring to FIG. 9B, another example of calculating the first number of suspension commands is illustrated. FIG. 9B illustrates an example where write requests and read requests are mixedly input to a nonvolatile memory, it is required or expected that the nonvolatile memory operates with write performance and read performance approaching predetermined limit bandwidths of the write requests and the read requests, and it is required or expected that the write requests and/or the read requests are satisfied within a predetermined tolerance with respect to the limit bandwidths.

For example, the write requests and the read requests may be sufficiently input, the limit bandwidth of the write requests and the limit bandwidth of the read requests may be about 5000 MBPs and about 16000 MBPs, respectively, and each may have a tolerance of about 5%. In addition, NAND utilization may become about 100% (at NAND bound) when the limit bandwidths may be satisfied. Based on the limit bandwidth of the write requests and the limit bandwidth of the read requests (operation S421b: W_PERF2=5000 MBps & operation S424b: R_PERF2=16000 MBps), and based on the tolerance of about 5%, performance loss of about 250 MBPs (=(5000 MBps*5)/100) may be tolerated for the write requests (operation S422b: W_LOSS_PERF2=250 MBps), and performance loss of about 800 MBPS (=(16000 MBps*5)/100) may be tolerated for the read requests (operation S425b: R_LOSS_PERF2=800 MBps). Assuming that program suspension bandwidth is about 4.8 KB during write operations, about 52.08 (=(250 MBPs*0.001)/4.8 KB) program suspensions may be allowed within time of about 1 ms during the write operations (operation S423b: W_SUS_ CNT2=52.08/1 ms). Assuming that program suspension bandwidth is about 64 KB during read operations, about 12.5 (=(800 MBPs*0.001)/64 KB) program suspensions may be allowed within time of about 1 ms during the write operations (operation S426b: R_SUS_CNT2=12.5/1 ms). As a result, about 64.58 program suspensions may be allowed within time of about 1 ms by adding results of operations S423b and S426b (operation S427b: MAX_SUS_ CNT2=64.58/1 ms).

However, above-described operations are merely examples, and example embodiments are not limited thereto.

Figure 10:
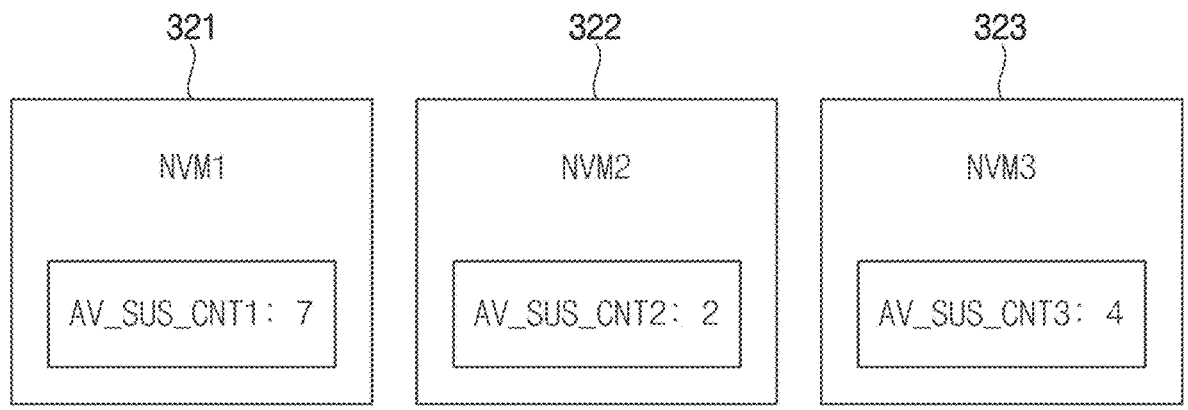
FIG. 10 is a diagram for describing an operation of calculating a second number of suspension commands in FIG. 7.

FIG. 10 is a diagram for describing an operation of calculating a second number of suspension commands in FIG. 7.

Referring to FIGS. 7 and 10, the first number of suspension commands and the second number of suspension commands may be calculated for each of the first, second, and third nonvolatile memories 321 to 323. For example, even if the first number of suspension commands is calculated to be the same for all the nonvolatile memories 321 to 323, the second number of suspension commands may be calculated differently depending on operating conditions of the nonvolatile memories 321 to 323. For example, the second number of suspension commands in the first nonvolatile memory 321 may be seven (e.g., AV_SUS_CNT1: 7), the second number of suspension commands in the second nonvolatile memory 322 may be two (e.g., AV_SUS_CNT2: 2), and the second number of suspension commands in the third nonvolatile memory 323 may be four (e.g., AV_SUS_ CNT3: 4).

Figure 11:
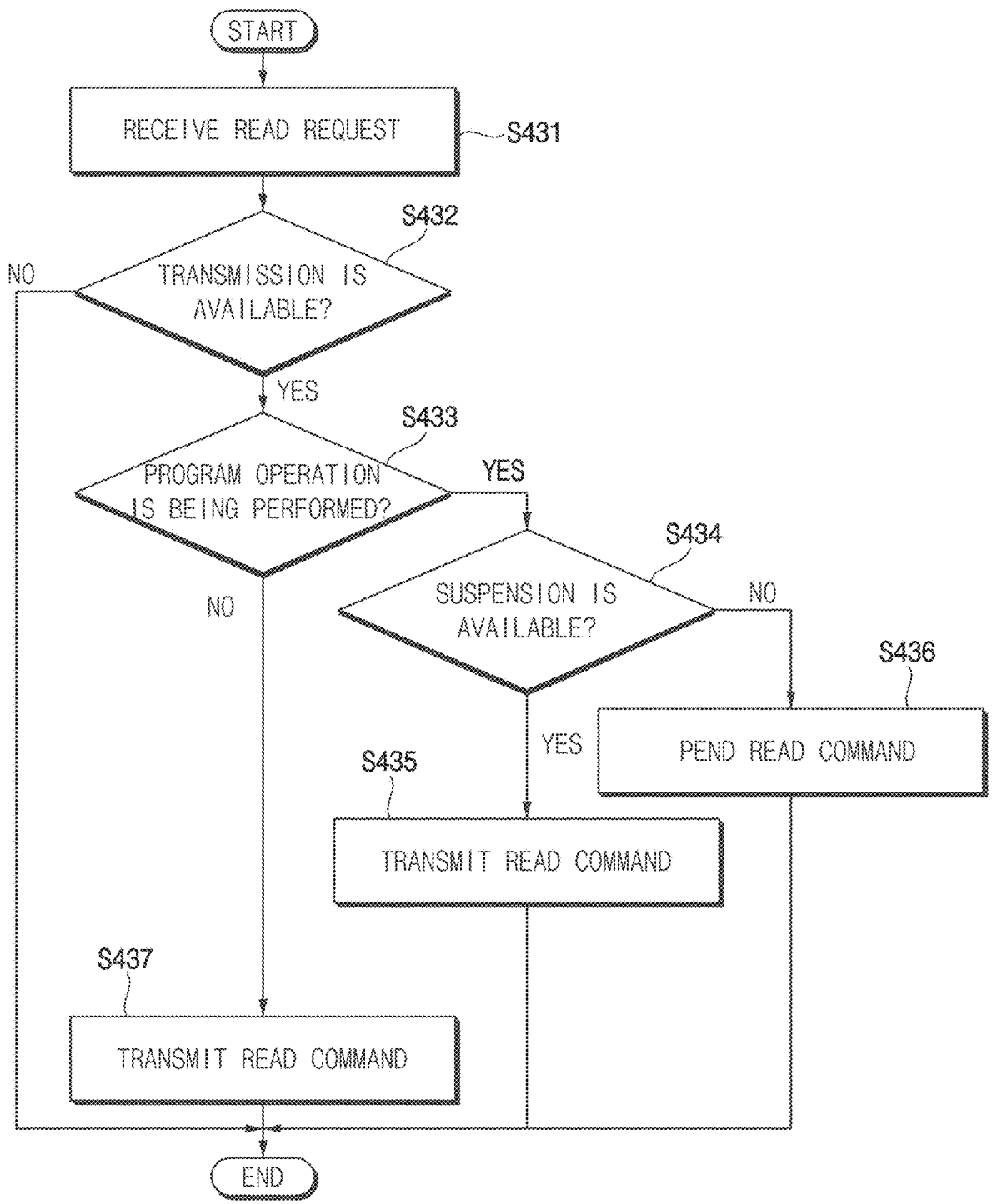
FIG. 11 is a flowchart illustrating an example of selectively transmitting a first suspension command in FIG. 7.
Figure 12A:
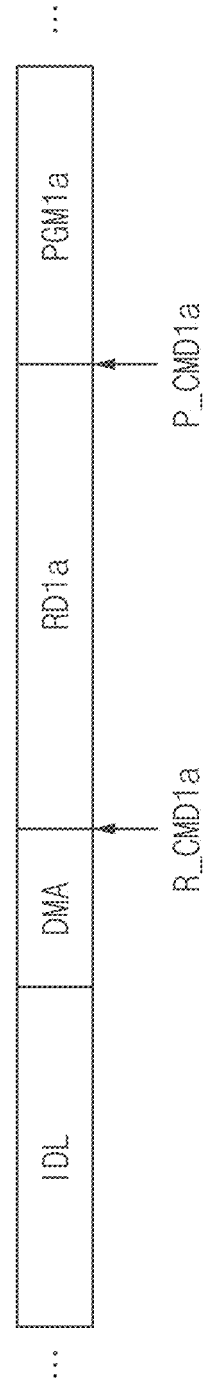
FIGS. 12A, 12B and 12C are diagrams for describing an operation of FIG. 11.
Figure 12B:
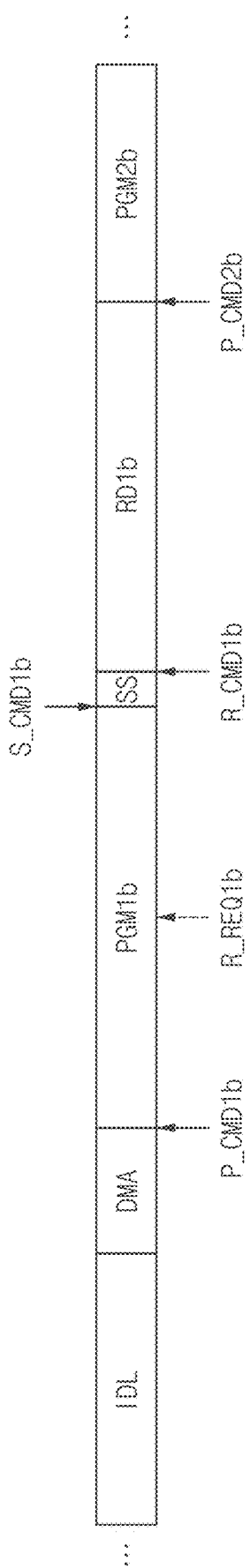
Figure 12C:
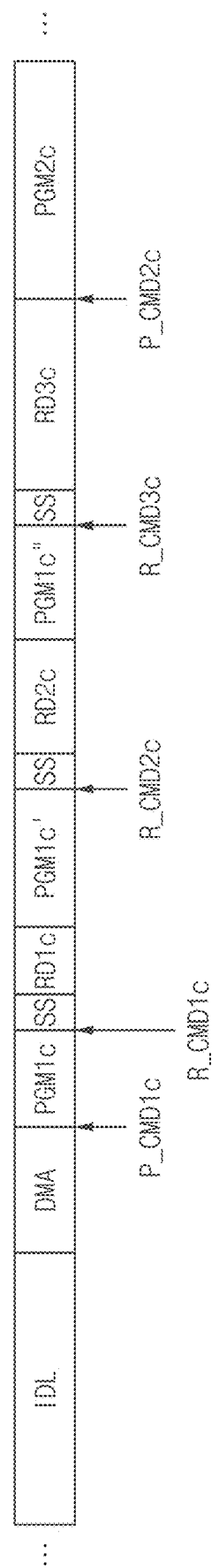

FIG. 11 is a flowchart illustrating an example of selectively transmitting a first suspension command in FIG. 7. FIGS. 12A, 12B and 12C are diagrams for describing an operation of FIG. 11.

Referring to FIGS. 7 and 11, in operation S415, when a first read request, which is a new read request, is received (operation S431), it may be checked or determined whether a transmission of a first read command, which corresponds to the first read request, to the first nonvolatile memory is available (operation S432).

When the transmission of the first read command to the first nonvolatile memory is available or possible (operation S432: YES), it may be checked or determined whether a first program operation is being performed on the first nonvolatile memory (operation S433), and it may be checked or determined whether a temporary suspension or stop of the first program operation is available (operation S434). For example, operation S434 may be performed based on the second number of suspension commands. When the transmission of the first read command to the first nonvolatile memory is unavailable or impossible (operation S432: NO), the process may be terminated.

When the first program operation is not being performed (operation S433: NO), the first read command may be immediately transmitted to the first nonvolatile memory without the program suspension operation (operation S437).

When the first program operation is being performed (operation S433: YES) and the temporary suspension of the first program operation is available (operation S434: YES), e.g., when the second number of suspension commands is not zero, the first suspension command for temporarily stopping the first program operation and the first read command may be transmitted to the first nonvolatile memory (operation S435). For example, the transmission operation of S435 may be performed immediately or may be performed in consideration of the read latency. For example, not only the first read command but also all read commands stored in the pending queue 861 may be transmitted together.

When the first program operation is being performed (operation S433: YES), and when temporary suspension of the first program operation is unavailable (operation S434: NO), e.g., when the second number of suspension commands is zero, the first read command may be pended (operation S436), and the first suspension command may not be transmitted to the first nonvolatile memory.

Referring to FIG. 12A, an example of operation S437 is illustrated. After an idle interval IDL and a direct memory access interval DMA, a read command R_CMD1a may be transmitted and a read operation RD1a may be performed. Thereafter, a program command P_CMD1a may be transmitted and a program operation PGM1a may be performed.

Referring to FIG. 12B, an example of operation S435 is illustrated. Even when a read request R_REQ1b is generated while a program command P_CMD1b is transmitted and a program operation PGM1b is being performed, a suspension command S_CMD1b and a read command R_CMD1b may not be immediately transmitted, and may be transmitted after specific time is elapsed from the read request R_REQ1b based on the program suspension control operation. A program suspension operation SS and a read operation RD1b may be performed based on the suspension command S_CMD1b and the read command R_CMD1b. Thereafter, a program command P_CMD2b may be transmitted and a program operation PGM1b may be performed.

Referring to FIG. 12C, a conventional method to which example embodiments are not applied is illustrated. While program operations PGM1c, PGM1c', PGM1c" and PGM2c are being performed based on the program commands P_CMD1c and P_CMD2c, read commands R_CMD1c, R_CMD2c and R_CMD3c may be indiscriminately transmitted, and then read operations RD1c, RD2c and RD3c may be performed and program suspension operations SS may be frequently caused.

Figure 13:
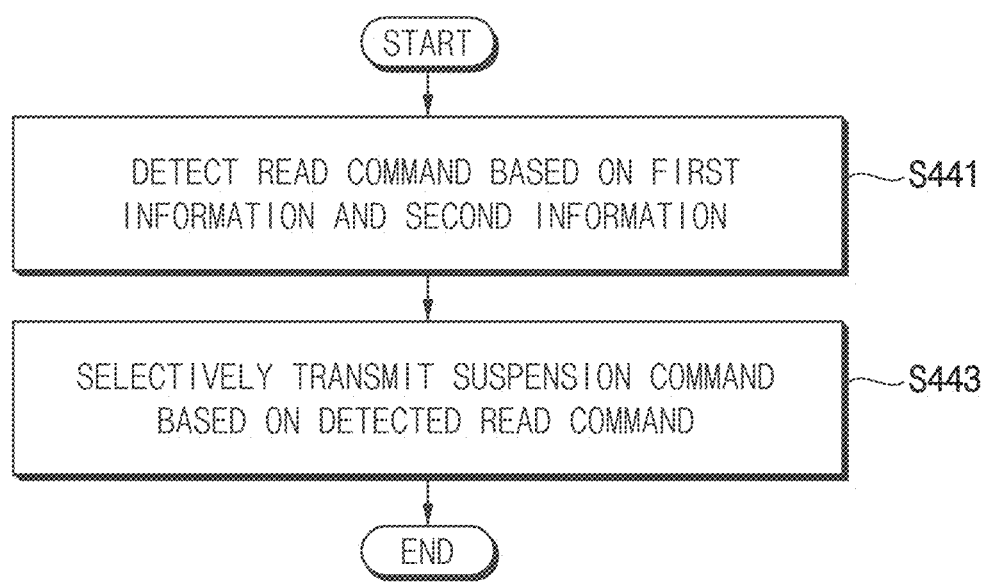
FIG. 13 is a flowchart illustrating an example of transmitting suspension commands to at least one of a plurality of nonvolatile memories in FIG. 1.
Figure 14A:
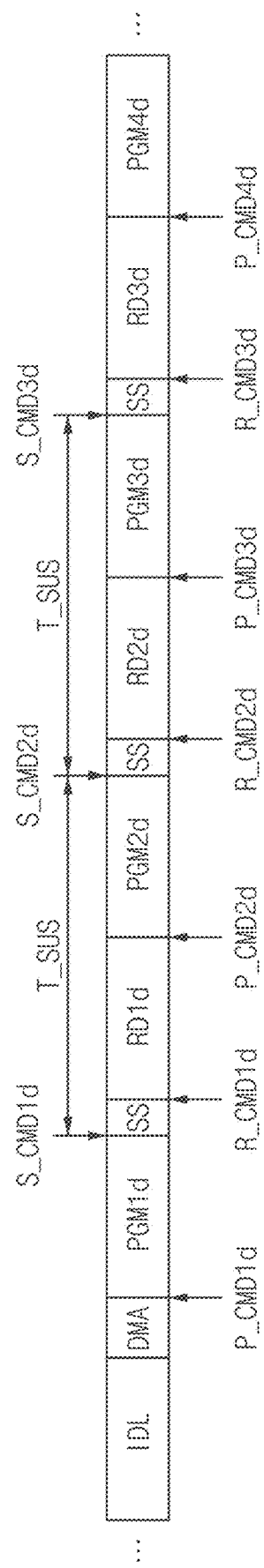
FIGS. 14A and 14B are diagrams for describing an operation of FIG. 13.
Figure 14B:
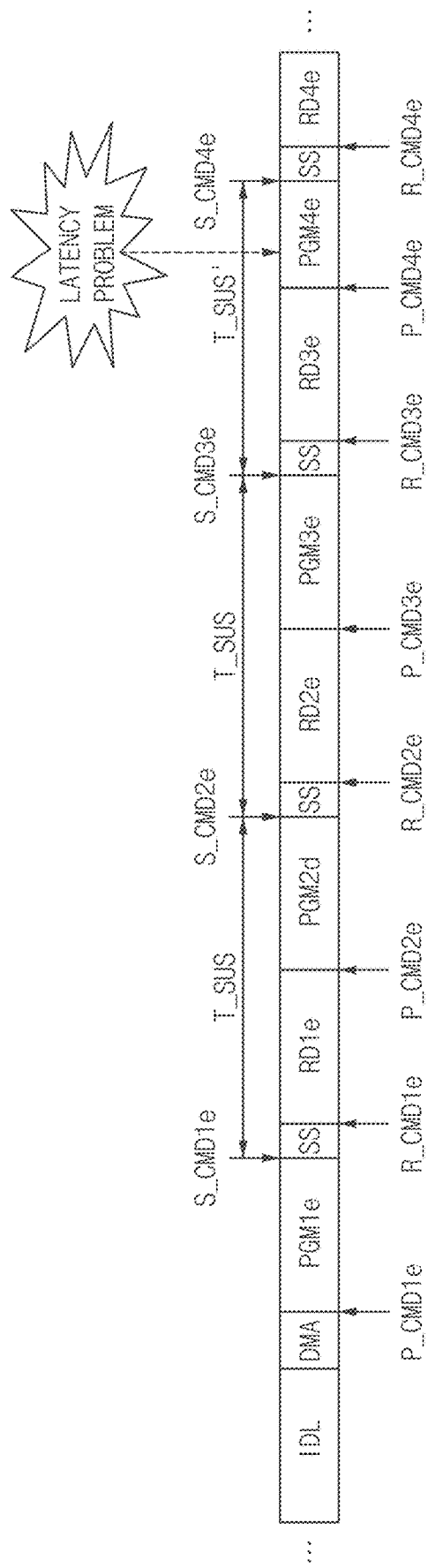

FIG. 13 is a flowchart illustrating an example of transmitting suspension commands to at least one of a plurality of nonvolatile memories in FIG. 1. FIGS. 14A and 14B are diagrams for describing an operation of FIG. 13.

Referring to FIGS. 1 and 13, in operation S400, the first information may include a latency condition required or expected for the storage device to execute the plurality of write requests and the plurality of read requests. In this example, the number of transmitting the suspension commands and the timing of transmitting the suspension commands may be adjusted to satisfy the latency condition.

For example, a first read command may be detected based on the first information and the second information (operation S441). The first read command may represent a command that does not satisfy the latency condition in a first nonvolatile memory. A first suspension command may be selectively transmitted to the first nonvolatile memory based on the first read command (operation S443). Although not illustrated in detail, an operation of calculating the number of program suspensions may be additionally performed.

FIG. 13 illustrates an example where generation and/or timing of program suspensions are adjusted to satisfy the latency condition in consideration of input time of each read request and time required or expected to execute each read request. For example, QoS information, e.g., read latency condition, may be received from the host device, time at which write/read requests are input from the host device may be measured, a situation where the read latency condition is not satisfied may be detected based on the input time of the write/read requests, and the read request may be executed or issued when the program operation is being performed and the read latency condition is not satisfied. Accordingly, the issue of the read request may be adjusted depending on the read latency condition, the QoS requirements may be satisfied in terms of both throughput and latency.

Referring to FIG. 14A, suspension commands S_CMD1d, S_CMD2d and S_CMD3d may be transmitted such that time intervals between the suspension commands S_CMD1d, S_CMD2d and S_CMD3d are equal to each other. For example, program operations PGM1d, PGM2d, PGM3d and PGM4d, read operations RD1d, RD2d and RD3d, and program suspension operations SS may be performed as illustrated, based on program commands P_CMD1d, P_CMD2d, P_CMD3d and P_CMD4d, read commands R_CMD1d, R_CMD2d and R_CMD3d, and suspension commands S_CMD1d, S_CMD2d and S_CMD3d. For example, time interval T_SUS between the suspension commands S_CMD1d and S_CMD2d and time interval T_SUS between the suspension commands S_CMD2d and S_CMD3d may be equal to each other.

Referring to FIG. 14B, a suspension command S_CMD4e may be transmitted at a time point in time when the read latency for each read request/command does not exceed. For example, program operations PGM1e, PGM2e, PGM3e and PGM4e, read operations RD1e, RD2e and RD3e, and program suspension operations SS based on program commands P_CMD1e, P_CMD2e, P_CMD3e and P_CMD4e, read commands R R_CMD1e, R_CMD2e and R_CMD3e, and suspension commands S_CMD1e, S_CMD2e, S_CMD3e may be similar to those described with reference to FIG. 14A. However, a read latency problem may occur while the program operation PGM4e is being performed, the suspension command S_CMD4e and a read command R_CMD4e may be additionally transmitted, and a program suspension operation SS and a read operation RD4e may be performed. For example, the suspension command S_CMD4e may be transmitted such that the read command R_CMD4e is transmitted within a predetermined time interval (e.g., within the read latency) from a time point at which the read request is executed, and thus time interval T_SUS' between the suspension commands S_CMD3e and S_CMD4e may be shorter than the time interval T_SUS.

In some example embodiments, the method may be implemented by combining the examples of FIGS. 7 and 13.

Figure 15:
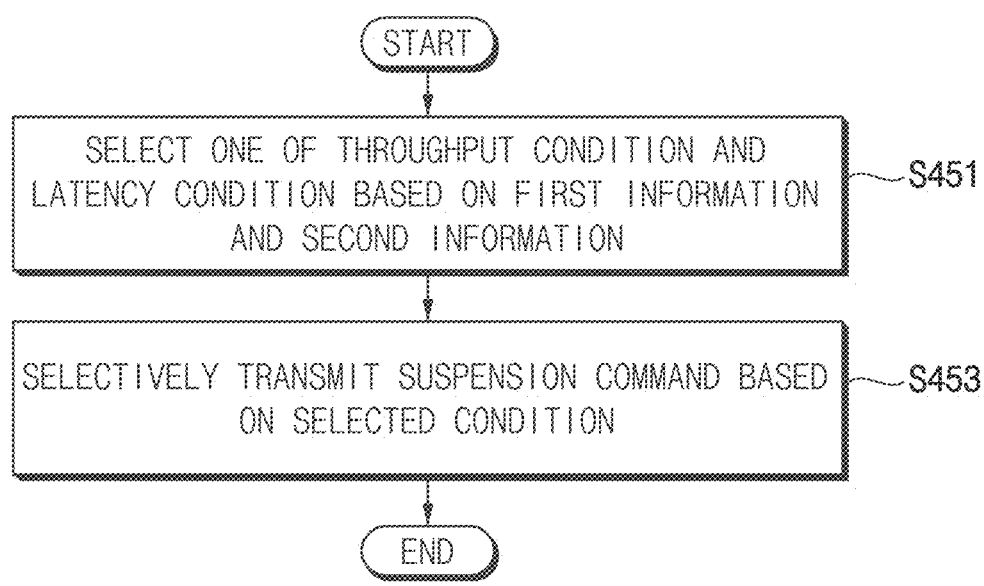
FIG. 15 is a flowchart illustrating an example of transmitting suspension commands to at least one of a plurality of nonvolatile memories in FIG. 1.
Figure 16A:
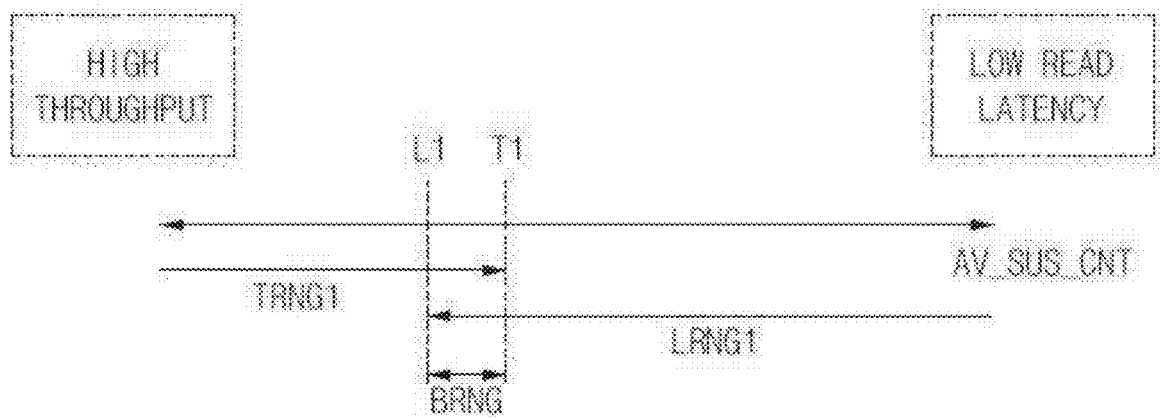
FIGS. 16A and 16B are diagrams for describing an operation of FIG. 15.
Figure 16B:
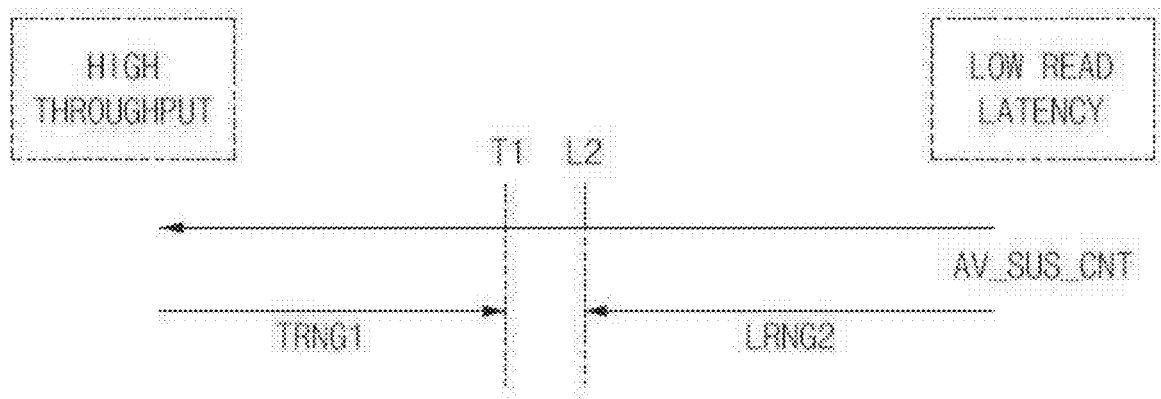

FIG. 15 is a flowchart illustrating an example of transmitting suspension commands to at least one of a plurality of nonvolatile memories in FIG. 1. FIGS. 16A and 16B are diagrams for describing an operation of FIG. 15.

Referring to FIGS. 1 and 15, in operation S400, the first information may include the throughput condition and the latency condition, and may further include priority information associated with the throughput condition and the latency condition. In this example, the number of transmitting the suspension commands and the timing of transmitting the suspension commands may be adjusted to satisfy at least one of the throughput condition and the latency condition. In some example embodiments, the priority information may be manually set in advance or may be actively set and/or changed from the outside (e.g., based on a user control signal received from the outside).

For example, a condition having a higher priority may be selected from among the throughput condition and the latency condition based on the first information and the second information (operation S451). A first suspension command may be selectively transmitted to the first nonvolatile memory based on the selected condition from among the throughput condition and the latency condition (operation S453).

Referring to FIG. 16A, an example where there exists a range BRNG commonly included in a range TRNG1 satisfying the throughput condition and a range LRNG1 satisfying the latency condition is illustrated. In this example, the number of suspension commands may be determined within the range BRNG, e.g., between numbers T1 and L1, without considering the priority information, and the program suspension control operation may be performed based on the determined number of suspension commands. The number T1 may represent the maximum number that satisfies the throughput condition and may be determined based on the allowable loss. The number L1 may represent the minimum number that satisfies the latency condition and may be determined by observing latency in real time.

Referring to FIG. 16B, an example where there is no range commonly included between the range TRNG1 satisfying the throughput condition and a range LRNG2 satisfying the latency condition. In this example, one of numbers T1 and L2 may be selected based on the priority information, as illustrated in FIG. 15, and the program suspension control operation may be performed based on the selected number.

Figure 17:
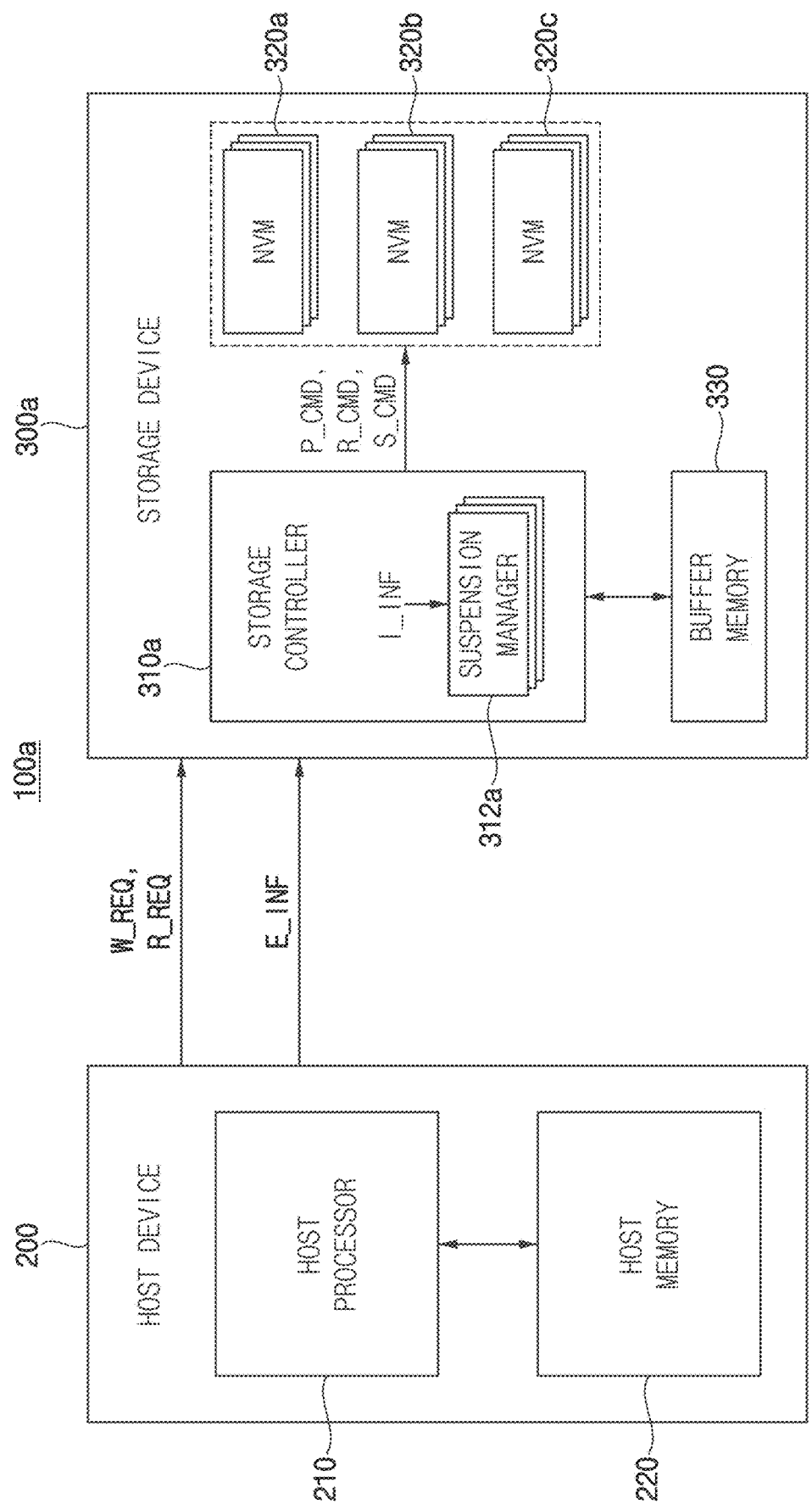
FIG. 17 is a block diagram illustrating a storage device and a storage system including the storage device according to some example embodiments.

FIG. 17 is a block diagram illustrating a storage device and a storage system including the storage device according to some example embodiments. The descriptions repeated with FIG. 2 will be omitted for brevity.

Referring to FIG. 17, a storage system 100a includes a host device 200 and a storage device 300a.

The storage system 100a of FIG. 17 may be substantially the same as the storage system 100 of FIG. 2, except that a storage controller 310a included in the storage device 300a is partially changed.

The storage controller 310a may include a plurality of suspension managers 312a. Each of the plurality of suspension managers 312a may perform the program suspension control operation for each channel. Each of the plurality of suspension managers 312a may be referred to as a channel (or channel-level) suspension manager.

For example, the plurality of nonvolatile memories 320a to 320c may include first nonvolatile memories and second nonvolatile memories. The first nonvolatile memories may be connected to the storage controller 310a (e.g., a first suspension manager among the plurality of suspension managers 312a) through a first channel. The second nonvolatile memories may be connected to the storage controller 310a (e.g., a second suspension manager among the plurality of suspension managers 312a) through a second channel different from the first channel. The storage controller 310a (e.g., the first suspension manager) may control a first number of suspension commands transmitted to at least one of the first nonvolatile memories and a first timing of suspension commands transmitted to at least one of the first nonvolatile memories. The storage controller 310a (e.g., the second suspension manager) may control a second number of suspension commands transmitted to at least one of the second nonvolatile memories and a second timing of suspension commands transmitted to at least one of the second nonvolatile memories, independently from the first number of suspension commands and the first timing of suspension commands. Configuration of the nonvolatile memories 320a to 320c and the channels will be described with reference to FIG. 18.

Figure 18:
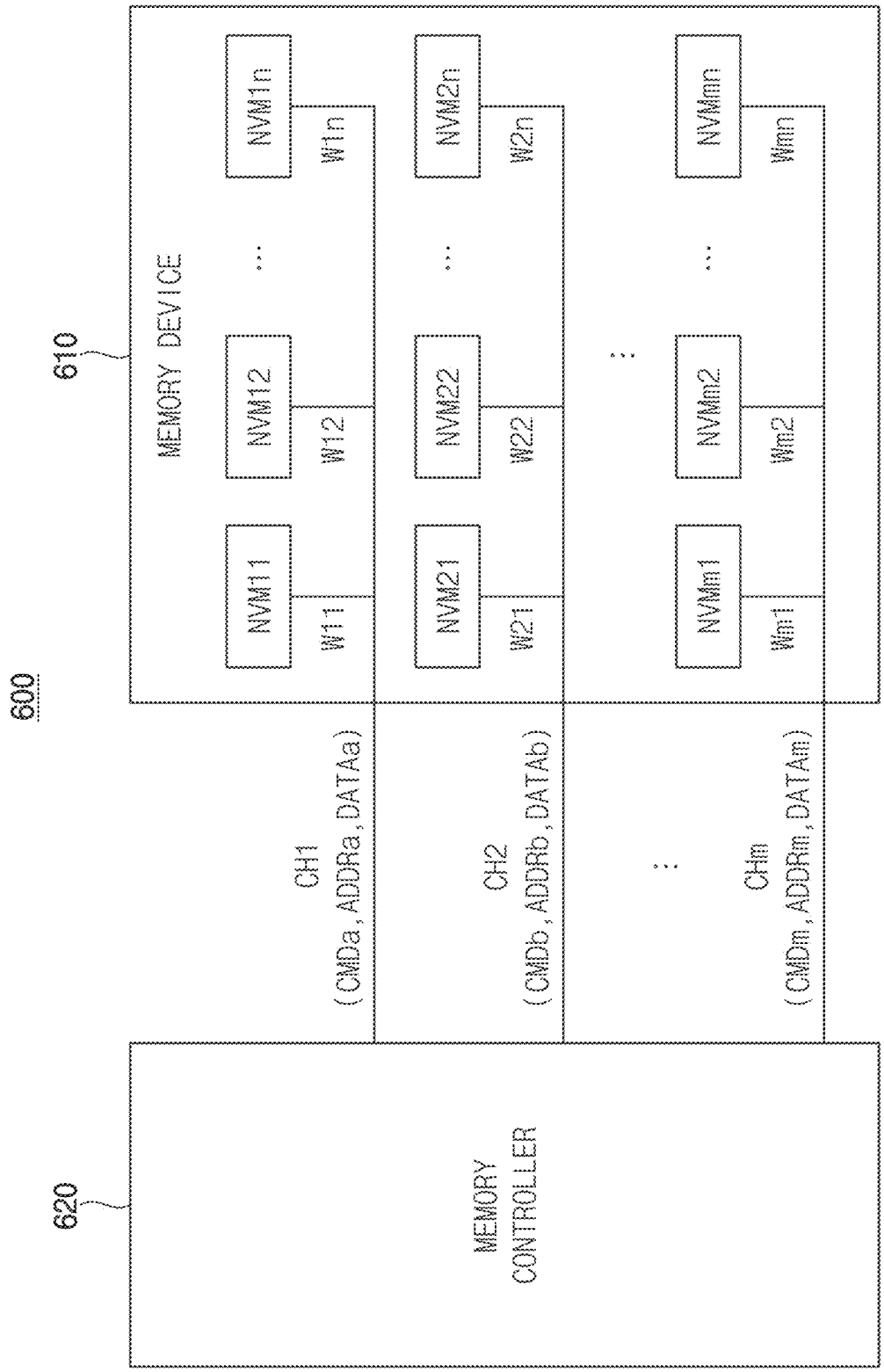
FIG. 18 is a block diagram illustrating nonvolatile memories and a memory system including the nonvolatile memories according to some example embodiments.

FIG. 18 is a block diagram illustrating nonvolatile memories and a memory system including the nonvolatile memories according to some example embodiments.

Referring to FIG. 18, a memory system 600 may include a memory device 610 and a memory controller 620. The memory system 600 may support a plurality of channels CH1, CH2, . . . , CHm, and the memory device 610 may be connected to the memory controller 620 through the plurality of channels CH1 to CHm. For example, the memory system 600 may correspond to the storage device 300a in FIG. 17.

The memory device 610 may include a plurality of nonvolatile memories NVM11, NVM12, . . . , NVM1n, NVM21, NVM22, . . . , NVM2n, NVMm1, NVMm2, . . . , NVMmn. For example, the nonvolatile memories NVM11 to NVMmn may correspond to the nonvolatile memories 320a to 320c in FIG. 17. Each of the nonvolatile memories NVM11 to NVMmn may be connected to one of the plurality of channels CH1 to CHm through a way corresponding thereto. For example, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the memory controller 620. In some example embodiments, each of the nonvolatile memories NVM11 to NVMmn may be implemented as a die or a chip, however, example embodiments are not limited thereto.

The memory controller 620 may transmit and/or receive signals to and from the memory device 610 through the plurality of channels CH1 to CHm. For example, the memory controller 620 may correspond to the storage controller 310a in FIG. 17. For example, the memory controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm or may receive the data DATAa to DATAm from the memory device 610.

The memory controller 620 may select at least one of the nonvolatile memories NVM11 to NVMmn, which is connected to each of the channels CH1 to CHm, by using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1n connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11.

The memory controller 620 may transmit and receive signals to and from the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control up to overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

Although FIG. 18 illustrates an example where the memory device 610 communicates with the memory controller 620 through m channels and includes n nonvolatile memories corresponding to each of the channels, the number of channels and the number of nonvolatile memories connected to one channel may be variously determined according to some example embodiments.

Figure 19:
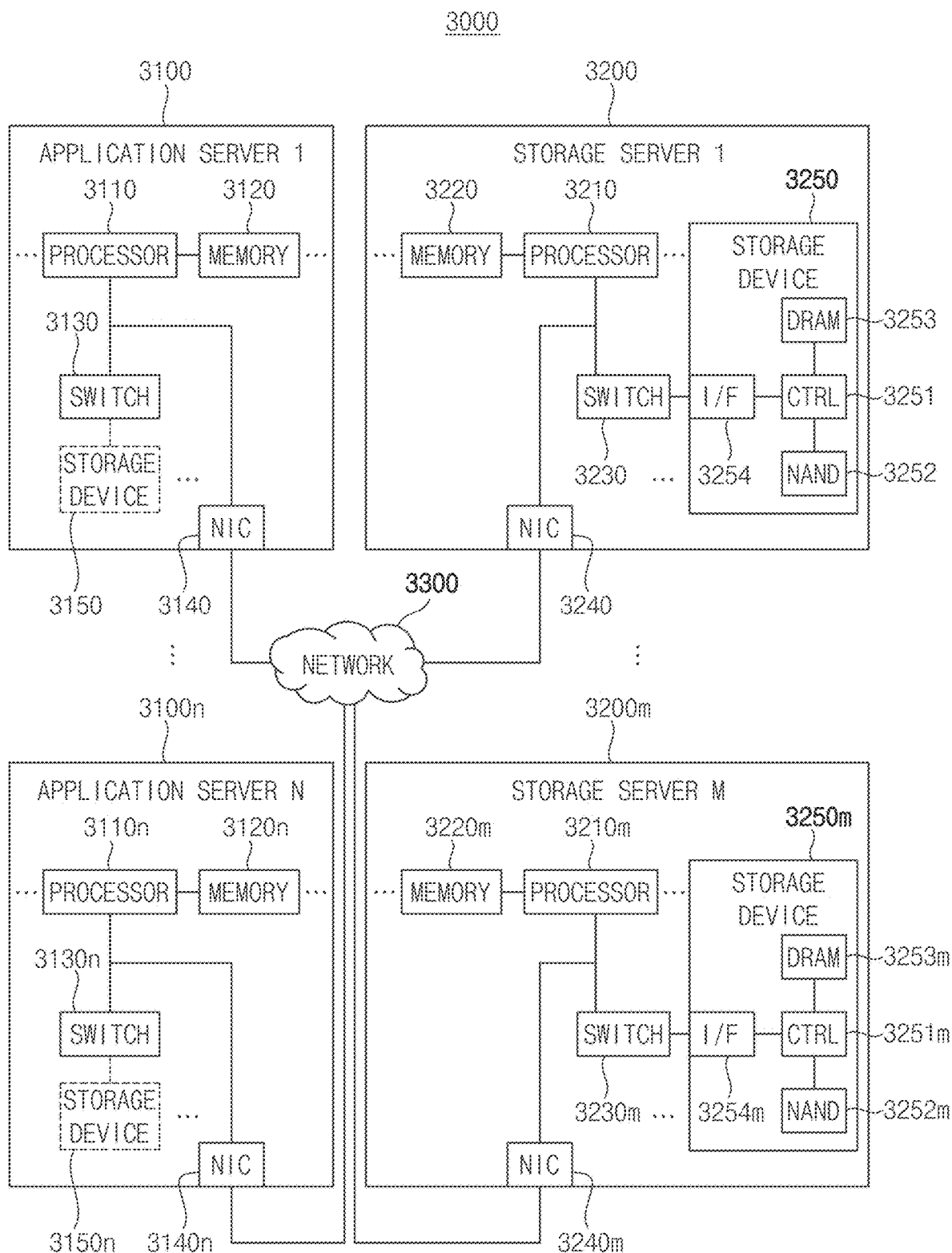
FIG. 19 is a block diagram illustrating a data center including a storage device according to some example embodiments.

FIG. 19 is a block diagram illustrating a data center including a storage device according to some example embodiments.

Referring to FIG. 19, a data center 3000 may be or include or be included in a facility that collects various types of data and provides various services, and may be referred to as a data storage center. The data center 3000 may be a system for operating search engines and databases, and may be a computing system used by companies such as banks and/or government agencies. The data center 3000 may include application servers 3100 to 3100n and storage servers 3200 to 3200m. The number of the application servers 3100 to 3100n and the number of the storage servers 3200 to 3200m may be variously selected according to some example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to some example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to some example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internetprotocol (TCP/IP) network and is implemented according to an iSCSI (a SCSI over TCP/IP or an Internet SCSI) protocol. In some example embodiments, the network 3300 may be a general network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, various example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 of the storage device 3250 may provide a physical connection between the processor 3210 and a controller 3251 of the storage device 3250 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through one or more of a wired interface, a wireless interface, a Bluetooth interface, an optical interface, or the like. The NIC 3240 may further include one or more of an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data that is corrected with an error correction code (ECC) engine (not shown). For example, the data may be processed by a data bus inversion (DBI) and/or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m of the storage devices 3250 and 3250m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control up to the overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 in the storage device 3250 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

Each of the storage devices 3250 to 3250m may be the storage device according to some example embodiments, and may perform the method of operating the storage device according to some example embodiments.

Example embodiments may be applied to various electronic devices and systems that include the storage devices. For example, example embodiments may be applied to systems such as one or more of a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Any or all of the elements described with reference to the figures may communicate with any or all other elements described with reference to the corresponding figures. For example, any element may engage in one-way and/or two-way and/or broadcast communication with any or all other elements in the figures, to transfer and/or exchange and/or receive information such as but not limited to data and/or commands, in a serial and/or parallel manner, via a wireless and/or a wired bus (not illustrated). The information may be in encoded various formats, such as in an analog format and/or in a digital format.

The foregoing is illustrative of example embodiments and is not to be construed as limiting thereof. Although various example embodiments have been described, those of ordinary skill in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims. Furthermore example embodiments are not necessarily mutually exclusive with one another. For example, some example embodiments may include one or more features described with reference to one or more figures, and may also include one or more other features described with reference to one or more other figures.

What is claimed is:

1. A method of operating a storage device, the method comprising:

receiving first information from a host device, the first information associated with an operation of the storage device;

receiving second information,
- the second information being internally generated based on a plurality of write requests, a plurality of read requests, and the operation of the storage device,
- the plurality of write requests and the plurality of read requests being received from the host device;

transmitting a plurality of program commands and a plurality of read commands to a plurality of nonvolatile memories,
- the plurality of program commands and the plurality of read commands corresponding to the plurality of write requests and the plurality of read requests, respectively; and transmitting suspension commands to at least one of the plurality of nonvolatile memories,
- the suspension commands being generated based on the first information and the second information, and
- the suspension commands being used to temporarily suspend program operations performed based on the plurality of program commands, wherein a number of the suspension commands and a timing of the suspension commands are controlled and adaptively changed based on the first information and the second information, and in response to changing at least one of the plurality of write requests and the plurality of read requests, the number of the suspension commands and the timing of the suspension commands are adaptively changed.

2. The method of claim 1, wherein
a read throttling operation is selectively performed based on the number of the suspension commands, and the timing of the suspension commands, and
the read throttling operation includes
- a first read operation performed on a first nonvolatile memory among the plurality of nonvolatile memories is restricted, and
- a first program operation performed on the first nonvolatile memory.

3. The method of claim 2, wherein
the first read operation is performed based on
- a first read command corresponding to a first read request,
- the first program operation is performed based on a first program command corresponding to a first write request, and
- a timing of a first suspension command and the first read command is adjusted based on the first information and the second information, wherein the first suspension command is a command used to temporarily stop the first program operation.

4. The method of claim 2, wherein the first information includes a throughput condition for the storage device to execute the plurality of write requests and the plurality of read requests.

5. The method of claim 4, wherein
transmitting the suspension commands to the at least one of the plurality of nonvolatile memories includes
satisfying the throughput condition by
- adjusting the number of the suspension commands, and
- adjusting the timing of the suspension commands.

6. The method of claim 5, wherein
adjusting the number of the suspension commands and the timing of the suspension commands includes
- calculating a first number of suspension commands based on the first information and the second information, the first number of suspension commands representing a maximum number of suspension commands capable of being generating per unit time in a first nonvolatile memory,
- calculating a second number of suspension commands based on the first number of suspension commands, the second number of suspension commands representing a number of possible suspension commands capable of being generated in the first nonvolatile memory, and
- selectively transmitting a first suspension command to the first nonvolatile memory based on the second number of suspension commands.

7. The method of claim 6, wherein
calculating the first number of suspension commands includes
- calculating a third number of suspension commands associated with a maximum number of suspension commands capable of generating while the plurality of write requests are executed,
- calculating a fourth number of suspension commands associated with a maximum number of suspension commands capable of generating while the plurality of read requests are executed, and
- obtaining the first number of suspension commands based on the third number of suspension commands and the fourth number of suspension commands.

8. The method of claim 6, wherein
selectively transmitting the first suspension command to the first nonvolatile memory includes
- the first program operation temporarily stopping while the first program operation is being performed on the first nonvolatile memory,
- transmitting the first suspension command and a first read command to the first nonvolatile memory, the first suspension command temporarily stopping the first program operation, the first read command corresponding to a first read request, and
- queuing the first read command and the first suspension command to the first nonvolatile memory based on the first program operation being incapable of temporarily stopping during the first program operation being performed on the first nonvolatile memory.

9. The method of claim 1, wherein the first information includes a latency condition for the storage device to execute the plurality of write requests and the plurality of read requests.

10. The method of claim 9, wherein
transmitting the suspension commands to the at least one of the plurality of nonvolatile memories includes
adjusting the number of the suspension commands and the timing of the suspension commands to satisfy the latency condition.

11. The method of claim 10, wherein
adjusting the number of the suspension commands and the timing of the suspension commands includes
detecting a first read command based on the first information and the second information, the first read command representing a command that does not satisfy the latency condition in a first nonvolatile memory, and selectively transmitting a first suspension command to the first nonvolatile memory based on the first read command.

12. The method of claim 11, wherein
selectively transmitting the first suspension command to the first nonvolatile memory includes
transmitting the first suspension command to the first nonvolatile memory such that a first time interval and a second time interval are equal to each other,
wherein the first time interval represents a time interval between
a first time point at which the first suspension command is transmitted to the first nonvolatile memory, and
a second time point at which a second suspension command prior to the first suspension command was already transmitted to the first nonvolatile memory, and
wherein the second time interval represents a time interval between the first time point and a third time point, such that during the second time interval a third suspension command subsequent to the first suspension command is transmitted to the first nonvolatile memory.

13. The method of claim 11, wherein
selectively transmitting the first suspension command to the first nonvolatile memory includes
transmitting the first suspension command to the first nonvolatile memory such that the first read command is transmitted to the first nonvolatile memory within a first time interval from a first time point at which a first read request corresponding to the first read command is executed.

14. The method of claim 11, wherein
the first information includes
a throughput condition for the storage device to execute the plurality of write requests and the plurality of read requests,
a latency condition for the storage device to execute the plurality of write requests and the plurality of read requests, and
a priority information associated with the throughput condition and the latency condition.

15. The method of claim 14, wherein
transmitting the suspension commands to the at least one of the plurality of nonvolatile memories includes
adjusting the number of the suspension commands and the timing of the suspension commands to satisfy at least one of the throughput condition and the latency condition.

16. The method of claim 15, wherein
adjusting the number of the suspension commands and the timing of the suspension commands includes
selecting a condition having a higher priority from among the throughput condition and the latency condition based on the first information and the second information, and
selectively transmitting a first suspension command to the first nonvolatile memory based on the selected condition from among the throughput condition and the latency condition.

17. The method of claim 1, wherein
the second information includes
write bandwidth information and read bandwidth information obtained by monitoring the plurality of write requests and the plurality of read requests, and
scheduling overhead information obtained by monitoring the operation of the storage device.

18. A storage device comprising:
a storage controller; and
a plurality of nonvolatile memories controlled by the storage controller,
wherein the storage controller is configured to
receive first information from a host device, the first information associated with an operation of the storage device,
receive second information,
the second information being internally generated based on a plurality of write requests, a plurality of read requests and the operation of the storage device,
the plurality of write requests and the plurality of read requests being received from the host device,
transmit a plurality of program commands and a plurality of read commands to the plurality of nonvolatile memories,
the plurality of program commands and the plurality of read commands corresponding to the plurality of write requests and the plurality of read requests, respectively, and
transmit suspension commands to at least one of the plurality of nonvolatile memories,
the suspension commands being generated based on the first information and the second information, and
the suspension commands being used to temporarily stop program operations performed based on the plurality of program commands,
wherein a number of the suspension commands and a timing of the suspension commands are controlled and adaptively changed based on the first information and the second information, and
in response to changing at least one of the plurality of write requests and the plurality of read requests, the number of the suspension commands and the timing of the suspension commands are adaptively changed.

19. The storage device of claim 18, wherein
the plurality of nonvolatile memories includes
first nonvolatile memories connected to the storage controller through a first channel, and
second nonvolatile memories connected to the storage controller through a second channel, the second channel being different from the first channel,
wherein the storage controller is configured to control
a first number of suspension commands transmitted to at least one of the first nonvolatile memories, and
a first timing of suspension commands transmitted to at least one of the first nonvolatile memories, and
wherein the storage controller is configured to control
a second number of suspension commands transmitted to at least one of the second nonvolatile memories, and
a second timing of suspension commands transmitted to at least one of the second nonvolatile memories, independently from the first number of suspension commands and the first timing of suspension commands.

20. A method of operating a storage device including a storage controller and a plurality of nonvolatile memories, the storage device configured to communicate with a host device located outside the storage device, the method comprising:
receiving first information from the host device by the storage controller, the first information including a throughput condition and a latency condition, the throughput condition being for the storage device to execute a plurality of write requests and a plurality of read requests received from the host device, the latency condition being for the storage device to execute the plurality of write requests and the plurality of read requests;

internally generating second information by the storage controller including write bandwidth information, read bandwidth information, and scheduling overhead information, the write bandwidth information and the read bandwidth information being obtained by monitoring the plurality of write requests and the plurality of read requests, the scheduling overhead information being obtained by monitoring an operation of the storage device;

transmitting a plurality of program commands and a plurality of read commands to the plurality of nonvolatile memories by the storage controller such that a plurality of program operations and a plurality of read operations are performed on the plurality of nonvolatile memories, the plurality of program commands and the plurality of read commands corresponding to the plurality of write requests and the plurality of read requests, respectively; and transmitting first suspension commands by the storage controller to a first nonvolatile memory among the plurality of nonvolatile memories such that a read throttling operation is selectively performed on the first nonvolatile memory, the read throttling operation representing an operation in which first read operations performed on the first nonvolatile memory are restricted while first program operations are being performed on the first nonvolatile memory, and the first suspension commands are generated based on the first information and the second information and being used to temporarily stop the first program operations, wherein a number of the first suspension commands and a timing of the first suspension commands are controlled and adaptively changed based on the first information and the second information, wherein, in response to changing at least one of the plurality of write requests and the plurality of read requests, the number of the first suspension commands and the timing of the first suspension commands are adaptively changed, wherein the number of the first suspension commands and the timing of the first suspension commands are adjusted to satisfy the throughput condition and the latency condition, and wherein transmitting the first suspension commands to the first nonvolatile memory includes calculating a first number of suspension commands based on the first information and the second information, the first number of suspension commands being associated with a maximum number of suspension commands capable of generating a per unit time in the first nonvolatile memory, calculating a second number of suspension commands based on the first number of suspension commands, the second number of suspension commands representing a number of possible suspension commands capable of currently being generated in the first nonvolatile memory, detecting a first read command based on the first information and the second information, the first read command representing a command that does not satisfy the latency condition in the first nonvolatile memory, and selectively transmitting the first suspension commands to the first nonvolatile memory based on the second number of suspension commands and the first read command.

* * * * *